(12) United States Patent
Noh et al.

(10) Patent No.: US 10,756,799 B2
(45) Date of Patent: Aug. 25, 2020

(54) METHOD AND DEVICE FOR TRANSMITTING AND RECEIVING CHANNEL STATE INFORMATION IN MOBILE COMMUNICATION SYSTEM

(71) Applicant: Samsung Electronics Co., Ltd., Gyeonggi-do (KR)

(72) Inventors: Hoon-Dong Noh, Gyeonggi-do (KR); Cheol-Kyu Shin, Gyeonggi-do (KR); Dong-Han Kim, Gyeonggi-do (KR); Young-Woo Kwak, Gyeonggi-do (KR); Youn-Sun Kim, Gyeonggi-do (KR); Jin-Young Oh, Seoul (KR); Young-Bum Kim, Seoul (KR); Seung-Hoon Choi, Gyeonggi-do (KR); Sang-Min Ro, Seoul (KR); Tae-Han Bae, Seoul (KR); Ju-Ho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 3 days.

(21) Appl. No.: 15/770,458

(22) PCT Filed: Oct. 21, 2016

(86) PCT No.: PCT/KR2016/011904
§ 371 (c)(1),
(2) Date: Apr. 23, 2018

(87) PCT Pub. No.: WO2017/069564
PCT Pub. Date: Apr. 27, 2017

(65) Prior Publication Data
US 2019/0215044 A1   Jul. 11, 2019

Related U.S. Application Data
(60) Provisional application No. 62/245,538, filed on Oct. 23, 2015.

(51) Int. Cl.
*H04B 7/06* (2006.01)
*H04L 1/06* (2006.01)
(Continued)

(52) U.S. Cl.
CPC ......... *H04B 7/0626* (2013.01); *H04B 7/0421* (2013.01); *H04L 1/06* (2013.01);
(Continued)

(58) Field of Classification Search
CPC ....... H04B 7/0626; H04B 7/0421; H04L 1/06; H04L 5/0048; H04L 5/005; H04L 5/1469;
(Continued)

(56) References Cited

U.S. PATENT DOCUMENTS

2012/0155414 A1  6/2012  Noh et al.
2013/0100922 A1  4/2013  Ahn et al.
(Continued)

FOREIGN PATENT DOCUMENTS

EP    3 125 438        2/2017
KR    1020130084607    7/2013
(Continued)

OTHER PUBLICATIONS

Samsung, "BI and PMI Reporting for Class B", R1-155505, 3GPP TSG RAN WG1 Meeting #82bis, Oct. 5-9, 2015, 5 pages.
(Continued)

*Primary Examiner* — Duc C Ho
(74) *Attorney, Agent, or Firm* — The Farrell Law Firm, P.C.

(57) ABSTRACT

Disclosed are: a communication technique for merging, with the Internet of Things (IoT) technology, a 5th-generation (5G) communication system for supporting a data transmission rate higher than that of a 4th-generation (4G) system; and a system therefor. The disclosure can be applied to intelligent services (for example, smart home, smart build-
(Continued)

ing, smart city, smart car or connected car, health care, digital education, retailing, security and safety related services) on the basis of 5G communication technology and IoT related technology. One embodiment of the present invention enables a terminal to receive at least one reference signal from a base station in a mobile communication system, and to generate channel state information on the basis of the at least one reference signal so as to transmit the channel state information to the base station, wherein the at least one reference signal is received in a downlink pilot time slot (DwPTS) by using a resource determined on the basis of a special subframe configuration.

20 Claims, 22 Drawing Sheets

(51) Int. Cl.
    *H04L 5/14*     (2006.01)
    *H04L 5/00*     (2006.01)
    *H04B 7/0417*   (2017.01)
    *H04L 27/26*    (2006.01)
    *H04W 72/04*    (2009.01)
(52) U.S. Cl.
    CPC ............ *H04L 5/005* (2013.01); *H04L 5/0048* (2013.01); *H04L 5/1469* (2013.01); *H04L 27/2607* (2013.01); *H04L 27/2613* (2013.01); *H04W 72/0446* (2013.01)
(58) Field of Classification Search
    CPC ........... H04L 27/2607; H04L 27/2613; H04W 72/0446
    See application file for complete search history.

(56) References Cited

U.S. PATENT DOCUMENTS

| | | | |
|---|---|---|---|
| 2013/0194931 A1* | 8/2013 | Lee | H04L 5/0053 370/241 |
| 2014/0092792 A1* | 4/2014 | Kim | H04L 5/0007 370/280 |
| 2014/0192917 A1* | 7/2014 | Nam | H04B 7/0417 375/267 |
| 2014/0198663 A1 | 7/2014 | Xu et al. | |
| 2014/0198675 A1 | 7/2014 | He et al. | |
| 2014/0233519 A1* | 8/2014 | Nagata | H04L 5/0057 370/329 |
| 2015/0043469 A1 | 2/2015 | Kim et al. | |
| 2015/0146542 A1* | 5/2015 | Xia | H04L 5/0032 370/241.1 |
| 2015/0156763 A1 | 6/2015 | Seo et al. | |
| 2015/0280801 A1* | 10/2015 | Xin | H04B 7/0478 370/329 |
| 2015/0349867 A1 | 12/2015 | Guo et al. | |
| 2016/0227485 A1* | 8/2016 | Davydov | H04W 52/146 |

FOREIGN PATENT DOCUMENTS

| | | |
|---|---|---|
| KR | 1020140144205 | 12/2014 |
| KR | 1020150023363 | 3/2015 |
| KR | 1020150079948 | 7/2015 |
| WO | WO 2014/113087 | 7/2014 |
| WO | WO 2014/166384 | 10/2014 |

OTHER PUBLICATIONS

CATT, "Beam Selection Indicator on PUCCH for CSI Reporting Class B", R1-155215, 3GPP TSG RAN WG1 Meeting #82bis, Oct. 5-9, 2015, 3 pages.
European Search Report dated Nov. 23, 2018 issued in counterpart application No. 16857821.9-1219, 15 pages.
European Search Report dated Aug. 8, 2018 issued in counterpart application No. 16857821.9-1219, 12 pages.
PCT/ISA/210 Search Report issued on PCT/KR2016/011904 (pp. 10).
PCT/ISA/237 Written Opinion issued on PCT/KR2016/011904 (pp. 7).

* cited by examiner

METHOD AND DEVICE FOR TRANSMITTING AND RECEIVING CHANNEL STATE INFORMATION IN MOBILE COMMUNICATION SYSTEM

TECHNICAL FIELD

The present disclosure relates to a method and device for transmitting and receiving channel state information in a wireless communication system.

BACKGROUND ART

In order to satisfy the demand for wireless data traffic that is increasing after popularization of the 4th-generation (4G) communication system, efforts for developing an improved 5th-generation (5G) communication system or a pre-5G communication system have been made. For this reason, the 5G communication system or pre-5G communication system is called a beyond 4G network communication system or a post Long Term Evolution (LTE) system.

It is considered to achieve a 5G communication system in millimeter wavebands (mmWave) (for example, a 60 GHz waveband) in order to a high data rate. Technologies such as beamforming, massive Multi-Input Multi-Output massive (MIMO), Full Dimensional MIMO (FD-MIMO), an array antenna, analog beamforming, and a large scale antenna have been discussed for the 5G communication system in order to reduce a path loss of radio waves and increase the transmission distance of radio waves in millimeter wavebands.

Further, technologies such as an improved small cell, an advanced small cell, a Cloud Radio Access Network (could RAN), an ultra-dense network, a Device to Device (D2D) communication, a wireless backhaul, a moving network, cooperative communication, Coordinated Multi-Points (CoMP), and interference cancellation have been developed for the 5G communication system to improve the network for the system.

In addition, hybrid FSK and QAM modulation (FQAM) and Sliding Window Superposition Coding (SWSC) that use Advanced Coding Modulation (ACM) type, and a Filter Bank Multi Carrier (FBMC), Non Orthogonal Multiple Access (NOMA), and Sparse Code Multiple Access (SCMA) that are advanced connection technologies have been developed for the 5G system.

On the other hand, the internet is evolving from a human-centric network on which people create and consume information to the Internet of Things (IoT) network on which distributed components such as things transmit/receive and process information. The Internet of Everything (IoE) technology may be an example of merging a big data processing technology using connection with a cloud server etc. with the IoT technology.

Technical elements such as a sensing technology, a wire/wireless communication and network infrastructure, a service interface technology, and a security technology are required to achieve the IoT, so, recently, technologies such as a sensor network, a Machine to machine (M2M) communication, and Machine Type Communication (MTC) for connecting between objects are studied.

An intelligent internet technology (IT) service that creates a new value for human life by collecting and analyzing data created from connected objects can be provided in the IoT environment. The IoT can be applied to fields such as a smart home, smart building, a smart city, a smart car or connected car, a smart grid, healthcare, smart appliances, and a high-tech medical service by merging and combining the IT and various industries.

Accordingly, there have been various attempts to applying the 5G communication system to the IoT network. For example, 5G communication technologies such as a sensor network, an object communication, and MTC are implemented by techniques such as beamforming, MIMO, and array antennas. It may be an example of mergence of the 5G technology and the IoT technology to apply a cloud wireless access network as the technology of processing big data described above.

The current mobile communication system is being developed into a high-speed and high-quality wireless packet data communication system for providing a data service and a multimedia service beyond the early stage of providing voice-based services. To this end, several standardization organizations such as 3rd-Generation Partnership Project (3GPP), 3GPP2, and Institute of Electrical and Electronics Engineers (IEEE) have progressed 3rd-generation advanced mobile communication system standardization to which a multiple access method using multi-carriers is applied. Recently, various mobile communication standards such as LTE of 3GPP, Ultra Mobile Broadband (UMB) of 3GPP2, and 802.16m of IEEE have been developed to support a high-speed and high-quality wireless packet data transmission service on the basis of the multiple access method using multi-carriers.

Existing 3rd-generation advanced mobile communication systems such as LTE, UMB, and 802.16m are based on the multi-carrier multiple access method and use MIMO antennas and various technologies such as beamforming, an Adaptive Modulation and Coding (AMC) method, and a channel sensitive scheduling method to improve the transmission efficiency. These technologies improve system capacity performance by improving the transmission efficiency by concentrating transmission power transmitted from several antennas or controlling the amount of data, depending on a channel quality etc., and selectively transmitting data to users having a good channel quality.

Most of these techniques are based on channel state information between an evolved node B (eNB) or a base station (BS) and user equipment (UE) or a mobile station (MS). Accordingly, a base station or a terminal needs to measure the channel station between the base station and the terminal, and for this purpose, a Channel State Information Reference Signal (CSI-RS) may be used. The eNB described above means a downlink transmission and uplink reception device at a predetermined place and one eNB performs transmission and reception for a plurality of cells. In one communication system, a plurality of eNBs is geometrically distributed and each performs transmission and reception for a plurality of cells.

Existing 3rd- and 4th-generation mobile communication systems such as LTE/LTE-Advanced (LTE-A) use a MIMO technology that uses a plurality of transmission and reception antennas for transmission to increase the data rate and the system capacity. The MIMO technology is a technology that spatially separates and transmits a plurality of information streams, using a plurality of transmission and reception antennas. The technique of spatially separating and transmitting a plurality of information streams is called spatial multiplexing. In general, how many information streams spatial multiplexing can be applied depends on the number of antennas of a transmitter and a receiver. In general, the index that shows how many information streams spatial multiplexing can be applied is called the rank of the corresponding transmission. When there are eight transmission and reception antennas, the MIMO technology that is supported under standards including up to LTE/LTE-A Release 11 supports spatial multiplexing, in which maximally up to eight ranks are supported.

Meanwhile, the FD-MIMO technology proposed to improve a network speed and increase frequency efficiency is a technology evolved from the LTE/LTE-A MIMO technology and uses many transmission antennas over eight (for example, thirty two or more transmission antennas).

In order to effectively achieve an FD-MIMO system to which the FD-MIMO technology is applied, a terminal has to accurately measure a channel situation and the intensity of interference and transmit effective channel state information to a base station using the measured factors. The base station receiving the channel state information determines which terminals it performs transmission to in relation to downlink transmission, which speed it performs transmission at, which precoding it applies, etc., using the channel state information. In an FD-MIMO system, there are many transmission antennas and a two-dimensional antenna array is considered, so it is inappropriate to apply a method of transmitting and receiving channel state information about an LTE/LTE-A system designed in consideration of only maximum eight one-dimensional array transmission antennas to the FD-MIMO system, and the problem of uplink overhead that has to transmit additional control information to obtain the same performance is generated.

In the FD-MIMO system, beamforming CSI-RSs are used to reduce the number of CSI-RS ports that a terminal has to measure at a time and overhead for all the CSI-RSs. A base station has to notify a terminal of various Codebook Subset Restrictions (CSR) in order to effectively achieve the beamforming CSI-RSs. However, the CSR is configured by a very large bitmap, so it may be a large burden to configure several CSRs in upper layer signaling such as an RRC message.

Further, when the number of cell specific beams that are supported by cell specific beamforming CSI-RSs or the number of UE specific beams that are supported by UE specific beamforming CSI-RSs is increased, the CSI-RS may be increased larger than a case when non-precoded CSI-RSs are used. A measurement restriction method that limits time sources of CSI-RSs that are measured by a terminal in order to minimize an increase of overhead may be applied to the beamforming CSI-RSs. However, a CSI report that is transmitted through a PUCCH cannot carry RI/W1/W2/CQI at a time for the characteristics of the PUCCH, so they are unavoidably transmitted several times. When the time resource for combining and reporting RI/W1 and W2/CQI with measurement restriction changes, there may be a problem with the reliability of the reported RI/W1.

DETAILED DESCRIPTION OF THE INVENTION

Technical Problem

According to an aspect of the present disclosure, there is provided a method and device for transmitting and receiving channel state information in a wireless communication system.

According to another aspect of the present disclosure, there is provided a method and device in which a base station configures CSR information in accordance with a CSI-RS resource and notifies a terminal of the CSR information in order to more efficiently transmit and receive data in an FD-MIMO system.

According to another aspect of the present disclosure, there is provided a method and device for applying a CSR for effectively operating a BF CSI-RS based on a plurality of CSI-RS resources.

According to another aspect of the present disclosure, there is provided a method and device for transmitting and receiving channel state information for preventing deterioration of performance that may be generated when a plurality of items of channel state information should be transmitted in the same subframe.

According to another aspect of the present disclosure, there is provided a method and device for reducing overhead related to a CSI-RS and improving reliability of channel state information.

According to another aspect of the present disclosure, there is provided a method and device for using additional resources according to a special subframe configuration to transmit and receive a CSI-RS.

Technical Solution

In accordance with an aspect of the present disclosure, a method of transmitting channel state information by a terminal in a mobile communication system, includes the steps of: receiving one or more reference signals from a base station; and generating channel state information on the basis of the reference signals and transmitting the channel state information to the base station, wherein the reference signals are received in a Downlink Pilot Time Slot (DwPTS), using a resource determined on the basis of a special subframe configuration.

In accordance with another aspect of the present disclosure, a method of transmitting channel state information by a base station in a mobile communication system, includes the steps of: transmitting reference signals to a terminal; and receiving channel state information created on the basis of the reference signals from the terminal, wherein the reference signals are received in a Downlink Pilot Time Slot (DwPTS), using a resource determined on the basis of a special subframe configuration.

In accordance with another aspect of the present disclosure, a method of transmitting channel state information by a terminal in a mobile communication system, includes the steps of: generating a plurality of items of channel state information on the basis of one or more reference signals received from a base station; and when at least two items of information of the items of channel state information have to be transmitted in the same subframe, joint-encoding and transmitting the two items of two channel state information to the base station in the subframe.

In accordance with another aspect of the present disclosure, a method of receiving channel state information by a base station in a mobile communication system, includes the steps of: transmitting one or more reference signals to a terminal; and receiving a plurality of items of channel state information created on the basis of the reference signals from the terminal, wherein, when at least two items of information of the items of channel state information have to be transmitted in the same subframe, the two items of two channel state information are joint-encoded and transmitted to the base station in the subframe.

In accordance with another aspect of the present disclosure, a method of transmitting channel state information by a terminal in a mobile communication system, includes the steps of: selecting one or more reference signals from a plurality of reference signals received from a base station; generating and transmitting information about the selected reference signals to the base station; and transmitting second channel state information, which has been most recently transmitted from the base station in relation to the selected reference signals, as first channel state information related to the selected reference signals, when the first channel state information is not created, wherein the first channel state information and the second channel state information are the same type of channel state information.

In accordance with another aspect of the present disclosure, a method of transmitting channel state information by a base station in a mobile communication system, includes the steps of: transmitting a plurality of reference signals to a terminal; receiving information about one or more reference signals selected by the terminal of the plurality of reference signals from the terminal; and receiving second channel state information, which has been most recently transmitted to the base station in relation to the selected reference signals, from the terminal as first channel state information related to the selected reference signals, when the first channel state information is not created by the terminal, wherein the first channel state information and the second channel state information are the same type of channel state information.

In accordance with another aspect of the present disclosure, a terminal device in a mobile communication system includes: a communication unit receiving one or more reference signals from a base station; and a control unit controlling the communication unit to create channel state information on the basis of the reference signals and transmit the channel state information to the base station, wherein the reference signals are received in a Downlink Pilot Time Slot (DwPTS), using a resource determined on the basis of a special subframe configuration.

In accordance with another aspect of the present disclosure, a base station device in a mobile communication system includes: a communication unit transmitting reference signals to a terminal; and a control unit controlling the communication unit to receive channel state information created on the basis of the reference signals from the terminal, wherein the reference signals are received in a Downlink Pilot Time Slot (DwPTS), using a resource determined on the basis of a special subframe configuration.

In accordance with another aspect of the present disclosure, a terminal device in a mobile communication system includes: a communication unit: and a control unit controlling the communication unit to create a plurality of items of channel state information on the basis of one or more reference signals received from a base station, and when at least two items of information of the items of channel state information have to be transmitted in the same subframe, to joint-encode and transmit the two items of two channel state information to the base station in the subframe.

In accordance with another aspect of the present disclosure, a base station device in a mobile communication system includes: a communication unit transmitting one or more reference signals to a terminal and receiving a plurality of items of channel state information created on the basis of the reference signals, wherein, when at least two items of information of the items of channel state information have to be transmitted in the same subframe, the two items of two channel state information are joint-encoded and transmitted to the base station in the subframe.

In accordance with another aspect of the present disclosure, a terminal device in a mobile communication system includes: a control unit selecting one or more reference signals from a plurality of reference signals received from a base station; and a communication unit generating and transmitting information about the selected reference signals to the base station, wherein the control unit controls the communication unit to a transmit second channel state information, which has been most recently transmitted from the base station in relation to the selected reference signals, as first channel state information related to the selected reference signals, when the first channel state information is not created, and the first channel state information and the second channel state information are the same type of channel state information.

In accordance with another aspect of the present disclosure, a base station device in a mobile communication system includes: a control unit transmitting a plurality of reference signals to a terminal and receiving information about one or more reference signals selected by the terminal of the plurality of reference signals from the terminal; and a control unit controlling the communication unit to receive second channel state information, which has been most recently transmitted to the base station in relation to the selected reference signals, from the terminal as first channel state information related to the selected reference signals, when the first channel state information is not created by the terminal, wherein the first channel state information and the second channel state information are the same type of channel state information.

The terms "include", "comprise", and derivatives thereof may mean inclusion without limitation, the term "or" may have an inclusive meaning and means "and/or", the phrases "associated with", "associated therewith", and derivatives thereof may mean to include, be included within, interconnect with, contain, be contained within, connected to or with, coupled to or with, be communicable with, cooperate with, interleave, juxtapose, be proximate to, be bound to or with, have, and have a property of, the term "controller" may mean any device, system, or a part thereof that controls at least one operation, and such a device may be implemented in hardware, firmware, or software, or some combinations of at least two of the same. It should be noted that the functionality associated with any particular processor may be centralized or distributed, whether locally or remotely. Definitions for certain words and phrases are provided throughout this patent document, those skilled in the art should understand that in many, if not most instances, such definitions apply to prior, as well as future uses of such defined words and phrases.

Advantageous Effects

According to an embodiment, it is possible to prevent assignment of excessive feedback resources and an increase in channel estimation complexity of a terminal when a base station having many transmission antennas in a two-dimensional antenna array structure transmits CSI-RSs. Further, according to an embodiment, a terminal can effectively measure all channels for many transmission antennas, can configure the channel as feedback information, and can notify a base station of the feedback information.

Further, according to an embodiment, it is possible to more efficiently transmit and receive data in an FD-MIMO system and effectively operate BF-CSI-RSs based on a plurality of CSI-RS resources. Further, according to an embodiment, it is possible to reduce overhead related to a CSI-RS and improve reliability of channel state information.

BRIEF DESCRIPTION OF DRAWINGS

The above and other aspects, features and advantages of the present disclosure will be more apparent from the following detailed description taken in conjunction with the accompanying drawings, in which.

It should be noted that like reference numbers are used to indicate the same or similar elements, features, and structures throughout the drawings.

MODE FOR CARRYING OUT THE INVENTION

Hereinafter, embodiments of the present disclosure will be described in detail with reference to the accompanying drawings. In the following description of the present disclosure, a detailed description of known functions or configurations incorporated herein will be omitted when it may make the subject matter of the present disclosure rather unclear. The terms which will be described below are terms defined in consideration of the functions in the present disclosure, and may be different according to users, intentions of the users, or customs. Therefore, the definitions of the terms should be made based on the contents throughout the specification.

A wireless communication system based on OFDM, particularly, an LTE/LTE-A system will be mainly exemplified in the following detailed description of various embodiments, but the spirit of the present disclosure may be applied to other communication systems having similar technical background and channel type through slight changes without departing much from the scope of the present disclosure, which could be determined by those skilled in the art. According to various embodiments, for example, a transmitter or a receiver may be a mobile station. The mobile station may be used together with other terms such as user equipment (UE), a device, and a subscriber terminal.

According to various embodiments, for example, a transmitter or a receiver may be a base station (BS). The base station may be used together with other terms such as a nose B, an evolved node B (eNB), an evolved universal terrestrial radio access network (E-UTRAN) node B (E-UTRAN node B), and an access point (AP).

Figure 1:
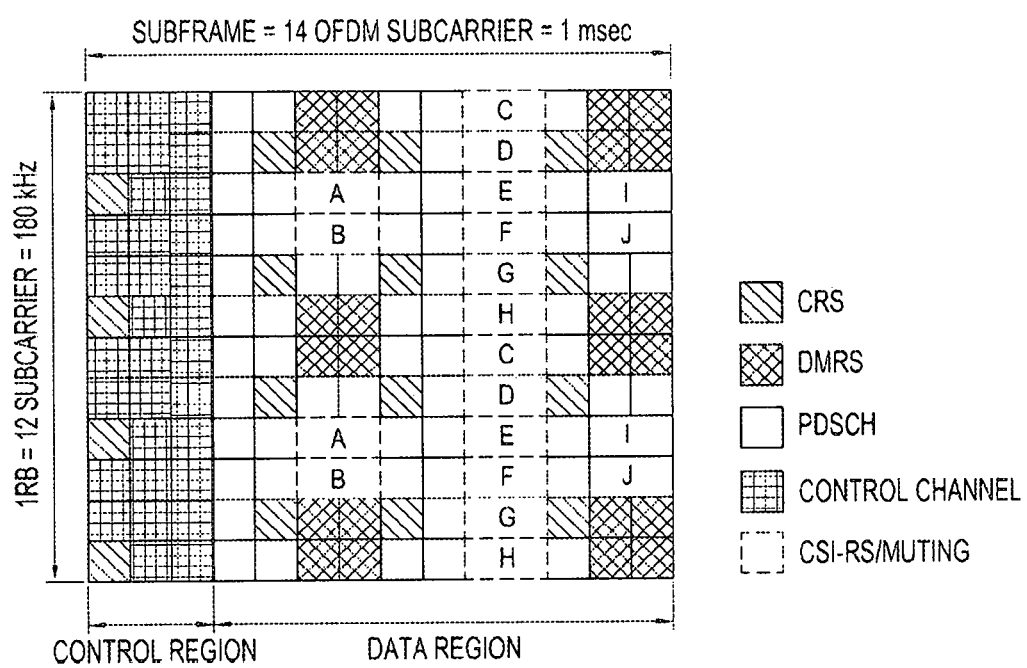
FIG. 1 is a diagram showing radio resources corresponding to one subframe and one resource block (RB) that are minimum units that can be scheduled through a downlink in a common mobile communication system.

FIG. 1 is a diagram showing radio resources corresponding to one subframe and one resource block (RB) that are minimum units that can be scheduled through a downlink in a common mobile communication system.

Referring to FIG. 1, a radio resource is composed of one subframe on a time axis and one RB on a frequency axis. The radio resource is composed of twelve subcarriers in a frequency domain and composed of fourteen OFDM symbols in a time domain, so it includes a total of 168 natural frequency and time positions. The natural frequency and time positions in FIG. 1 are usually referred to as resource elements (RE).

In the radio resource shown in FIG. 1, the following different signals can be transmitted.

1. Cell Specific Reference Signal (CRS): A reference signal that is periodically transmitted for all terminals belonging to one cell, and the terminals can use the CRS in common.

2. Demodulation Reference Signal (DMRS): A reference signal that is transmitted for a specific terminal and it is transmitted only when data is transmitted to the corresponding terminal. The DMRS may be composed of a total of eight DMRS ports. For example, a seventh port to a fourteenth port correspond to DMRS ports and these ports have orthogonality not interfering with each other, using Code Division Multiplexing (CDM) or Frequency Division Multiplexing (FDM).

3. PDSCH (Physical Downlink Shared Channel): A data channel that is transmitted through a downlink and it is used for a base station to transmit a traffic to a terminal. It is transmitted using an RE to which a reference signal is not transmitted in a data region of FIG. 1.

4. CSI-RS (channel state information reference signal): A reference signal that is transmitted for terminals belonging to one cell and it is used to measure a channel state. A plurality of CSI-RSs may be transmitted to one cell. In common mobile communication system, one CSI-RS may correspond to one, two, four, or eight antenna ports.

5. Other control channels (PHICH (physical hybrid ARQ indicator channel), PCFICH (physical control format indicator channel), PDCCH (physical downlink control channel)): Channels that are used to provide control information for a terminal to receive a PDSCH or transmit ACK/NACK for operating a Hybrid Automatic Repeat Request (HARD) for data transmission of an uplink.

Muting can be configured so that a CSI-RS that is transmitted by another base station, other than the signals described above, can be received by the terminals of a corresponding cell without interference in a mobile communication system. Such muting can be applied at a position where a CSI-RS can be transmitted, and in general, a terminal receives a traffic signal beyond a radio resource to which the muting is applied. Muting is also called a zero power CSI-RS. This is because, due to the characteristics of muting, muting is applied in the same way to the positions of CSI-RSs and transmission power is configured as zero, so no data is transmitted.

In FIG. 1, CSI-RSs can be transmitted using some of the positions indicated by A, B, C, D, E, E, F, G, H, I, and J, depending on the number of antennas for transmitting the CSI-RSs. Further, muting may also be applied to some of the positions indicated by A, B, C, D, E, E, F, G, H, I, and J. In particular, CSI-RSs can be transmitted using two, four, or eight REs, depending on the number of antenna ports that are used. When the number of antenna ports is two, CSI-RSs are transmitted to a half of a specific pattern in FIG. 1, when the number of antenna ports is 4, CSI-RSs are transmitted to the entire specific pattern, and when the number of antenna ports is 8, CSI-RSs are transmitted using two patterns. On the other hands, muting is always performed in the unit of one pattern. That is, muting may be applied to a plurality of patterns, but it cannot be applied to only some of one pattern when the position of muting does not overlap a CSI-RS. However, muting can be applied to only a portion of one pattern only when the positions of a CSI-RS and muting overlap each other.

When CSI-RSs are transmitted for two antenna ports, signals of the antenna ports are transmitted from two REs connected to a time axis and discriminated by orthogonal codes. Further, when CSI-RSs are transmitted for four antenna ports, by additionally using two REs for CSI-RSs for two antenna ports, signals are transmitted to the other two antenna ports in the same way. CSI-RSs are transmitted in the same way for eight antenna ports.

In a mobile communication system, a base station has to transmit a reference signal (RS) to a terminal to measure the downlink channel state of the terminal. The terminal measures the channel state between the base station and itself, using a CRS or a CSI-RS. The channel state should be measured in consideration of some fundamental factors and an interference amount on a downlink is included in the factors. The amount of interference on a downlink includes an interference signal and thermal noise that are generated by an antenna belonging to an adjacent base station and is an important factor for a terminal to determine the channel situation of a downlink. For example, when base station having one transmission antenna transmits a signal to a terminal having one reception antenna, the terminal, using the signal received from the base station, should determine energy per symbol that can be received through a down link and interference amounts to be simultaneously received at the period where a corresponding symbol is received, and then determine Es/Io. The determined Es/Io is converted into a data transmission speed or a corresponding value and the base station is notified of the value as a Channel Quality Indicator (CQI), whereby the base station can determine which data transmission speed it performs transmission at through a downlink to the terminal.

The terminal feeds back information about the channel state of the downlink to the base station such that the base station can use the information about the channel state to downlink scheduling. That is, the terminal measures an RS that the base station transmits to the downlink and transmits the measurement result as feedback information to the base station. In a broad sense, the following three factors can be included in the feedback information.

1. Rank Indicator (RI): The number of spatial layers that a terminal can receive in the current channel state.

2. Precoder Matrix Indicator (PMI): An indicator for a precoding matrix that a terminal prefers in the current channel state.

3. Channel Quality Indicator (CQI): The maximum data rate that a terminal can receive in the current channel state. The CQI may be replaced with a Signal-to-Interference-Plus-Noise Ratio (SINR), a maximum error correction code rate and modulation method, and data efficiency per frequency that can be used similar to the maximum data rate.

The RI, PMI, and CQI have meanings in association with each other. For example, the precoding matrix is differently defined for each rank, a PMI value when the RI is 1 and a PMI value when the RI is 2 are differently construed even if the values are the same. Further, even though a terminal determines the CQI, it is assumed that the rank value and the PMI value of which the terminal notified a base station have been applied to the base station. That is, when a terminal notifies a base station of RI_X, PMI_Y, and CQI_Z and when the rank is RI_X and the precoding is PMI_Y, it means that the terminal can receive a data rate corresponding to the CQI_Z. As described above, a terminal assumes which transmission method it applies to a base station when calculating a CQI, whereby it can obtain optimum performance when it actually performs transmission in the transmission method.

Meanwhile, periodic feedback of a terminal is configured in one of the following four feedback modes (or reporting modes), depending on what information is included:

1. Feedback mode 1-0: RI, Wideband CQI (wCQI)
2. Feedback mode 1-1: RI, wCQI, PMI
3. Feedback mode 2-0: RI, wCQI, Subband CQI (sCQI)
4. Feedback mode 2-1: RI, wCQI, sCQI, PMI Feedback timings of information for the four feedback modes are determined by values such as $N_{pd}$, $N_{OFFSET,CQI}$, $M_{RI}$, and $N_{OFFSET,RI}$ that are transmitted to a higher layer signal. In the feedback mode 1-0, the transmission period of a wCQI is an $N_{pd}$ subframe and the feedback timing is determined by a subframe offset value of $N_{OFFSET,CQI}$. Further, the transmission period of the RI is an $N_{pd} \cdot M_{RI}$ subframe and the offset is $N_{OFFSET,CQI}+N_{OFFSET,RI}$.

Figure 2:
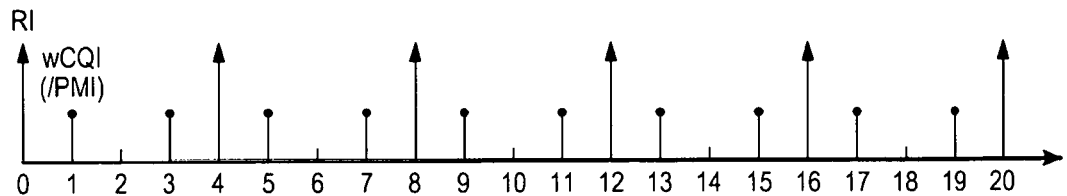
FIG. 2 is a diagram showing feedback timings of an RI and a wCQI when $N_{pd}=2$, $M_{RI}=2$, $N_{OFFSET,CQI}=1$, and $N_{OFFSET,RI}=-1$.

FIG. 2 is a diagram showing feedback timings of an RI and a wCQI when $N_{pd}=2$, $M_{RI}=2$, $N_{OFFSET,CQI}=1$, and $N_{OFFSET,RI}=-1$. The timings are subframe indexes in FIG. 2.

The feedback mode 1-1 has the same feedback timing as that of the feedback mode 1-0, but is different in that a wCQI and a PMI are transmitted together at a wCQI transmission timing where there are one or two antenna ports or four antenna ports in some cases.

In the feedback mode 2-0, the feedback period of the sCQI is an $N_{pd}$ subframe and the offset value is $N_{OFFSET,CQI}$. The feedback period of the wCQI is an $H \cdot N_{pd}$ subframe and the offset value is $N_{OFFSET,CQI}$, which is the same as the offset value of the sCQI. In this case, $H=J \cdot K+1$ is defined, where K is transmitted as a higher layer signal and J is determined in accordance with the system bandwidth. For example, J for a system of 10 MHz is defined as 3. As a result, the wCQI is transmitted once for each of H-time transmission of the sCQI instead of the sCQI. Further, the period of the RI is an $M_{RI} \cdot H \cdot N_{pd}$ subframe and the offset is $N_{OFFSET,CQI}+N_{OFFSET,RI}$.

Figure 3:
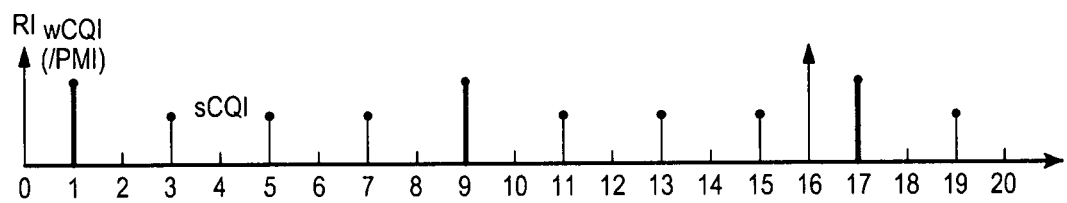
FIG. 3 is a diagram showing feedback timings of an RI, an sCQI, and a wCQI when $N_{pd}=2$, $M_{RI}=2$, J=3(10 MHz), K=1, $N_{OFFSET,CQI}=1$, and $N_{OFFSET,RI}=-1$.

FIG. 3 is a diagram showing feedback timings of an RI, a sCQI, and a wCQI when $N_{pd}=2$, $M_{RI}=2$, J=3(10 MHz), K=1, $N_{OFFSET,CQI}=1$, and $N_{OFFSET,RI}=-1$. The feedback mode 2-1 has the same feedback timing as that of the feedback mode 2-0, but is different in that a PMI is transmitted together at a wCQI transmission timing where there are one or two antenna ports or four antenna ports in some cases.

The feedback timing corresponds to some of cases when the number of CSI-RS antennas is one, two, or four. Further, for a terminal to which CSI-RSs for four antenna ports or eight antenna ports is assigned in some cases, two pieces of PMI information are feedback unlike the feedback timing. When CSI-RSs having four antenna ports or eight antenna ports are assigned in some cases, the feedback mode 1-1 is divided into two submodes. In the first submode of the two submodes, an RI is transmitted together with the first PMI and the second PMI information is transmitted together with a wCQI. The feedback period and offset for the wCQI and the second PMI are defined as $N_{pd}$ and $N_{OFFSET,CQI}$, and the feedback period and offset value for the RI and the first PMI information are defined as $M_{RI} \cdot N_{pd}$ and $N_{OFFSET,CQI}+N_{OFFSET,RI}$. When both of the first PMI($i_1$) and second PMI($i_2$) are reported to a base station from a terminal, the terminal and the base station determine a precoding matrix $W(i_1, i_2)$ corresponding to the first PMI and the second PMI in a set of precoding matrixes (codebook) shared by them as a precoding matrix that the terminal prefers. Further, assuming that the precoding matrix corresponding to the first PMI is $W_1$ and the precoding matrix corresponding to the second PMI is $W_2$, the terminal and the base station share the information that the precoding matrix that the terminal prefers has been determined as $W_1W_2$ that is a product of two matrixes.

When the feedback mode for eight CSI-RS antenna ports is 2-1, Precoding Type Indicator (PTI) information is added to the feedback information. In this case, the PTI is fed back together with an RI, the period is $M_{RI} \cdot H \cdot N_{pd}$ subframe and the offset is defined as $N_{OFFSET,CQI}+N_{OFFSET,RI}$.

In detail, when the PTI is 0, the first PMI, the second PMI, and the wCQI are all fed back. The wCQI and the second PMI are transmitted together at the same timing, the period is $N_{pd}$, and $N_{OFFSET,CQI}$ is given as the offset. The period of the first PMI period is $H' \cdot N_{pd}$ and the offset is $N_{OFFSET,CQI}$. H' is transmitted to a higher layer signal.

When the PTI is 1, the wCQI is transmitted together with the wideband second PMI and the sCQI is fed back together with the subband second PMI at a predetermined timing. The first PMI is not transmitted, and the second PMI and CQI are calculated and then reported by assuming the first PMI reported that has been most newly reported when the PTI is 0. The periods and offsets of the PTI and RI are the same as those when the PTI is 0. The period of the sCQI is determined as $N_{pd}$ subframe and the offset is determined as $N_{OFFSET,CQI}$. The wCQI and the second PMI are fed back with the period $H \cdot N_{pd}$ and the offset $N_{OFFSET,CQI}$, and H is determined in the same way when the number of CSI-RS antenna ports is 2.

Figure 4:
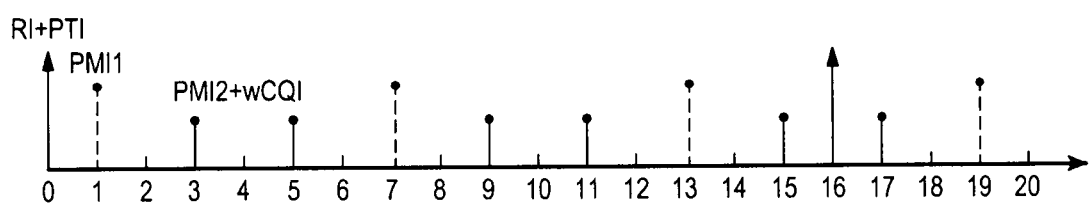
FIG. 4 is a diagram showing feedback timings for PTI=0 and PTI=1 when $N_{pd}=2$, $M_{RI}=2$, J=3(10 MHz), K=1, H'=3, $N_{OFFSET,CQI}=1$, and $N_{OFFSET,RI}=-1$.
Figure 5:
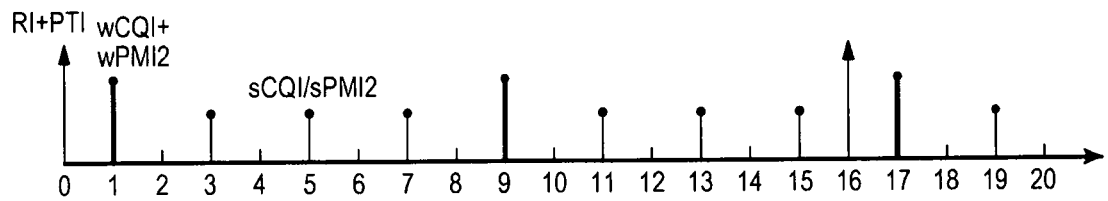
FIG. 5 is a diagram showing feedback timings for PTI=1 when $N_{pd}=2$, $M_{RI}=2$, J=3(10 MHz), K=1, H'=3, $N_{OFFSET,CQI}=1$, and $N_{OFFSET,RI}=-1$.

FIGS. 4 and 5 are diagrams showing feedback timings for PTI=0 and PTI=1 when $N_{pd}=2$, $M_{RI}=2$, J=3(10 MHz), K=1, H'=3, $N_{OFFSET,CQI}=1$, and $N_{OFFSET,RI}=-1$.

In common mobile communication systems, not only the periodic feedback of the terminal, but aperiodic feedback is supported. When a base station wants to the aperiodic feedback information of a specific terminal, the base station performs uplink data scheduling for the terminal by configuring an aperiodic feedback indicator included in Downlink Control Information (DCI) for uplink data scheduling of the terminal to perform specific aperiodic feedback. When the terminal receives the aperiodic feedback indicator configuration to perform aperiodic feedback in the n-th subframe, the terminal includes aperiodic feedback information into the data of the n+k-th subframe and performs uplink transmission. For example, k may be a parameter defined under 3GPP LTE Release 11 and is defined at 4 in Frequency Division Duplexing (FDD) and defined as in the following Table 1 in time division duplexing (TDD). Table 1 shows k for n subframe numbers in a TDD UL/DL configuration.

TABLE 1

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

When the aperiodic feedback is configured, the feedback information includes an RI, a PMI, and a CQI, similar to the periodic feedback, in which the RI and the PMI may not be fed back, depending on the feedback configuration. The CQI may include both of a wCQI and an sCQI or may include only a wCQI.

In common communication system, two steps of codebook selection restriction functions are provided in consideration of various factors such as feedback capacity and complexity of a terminal. The first codebook selection restriction function is Codebook Subset Restriction (CSR) based on a bitmap. The CSR is supported in transmission modes (TM) 3, 4, 5, and 6 and TMs 8, 9, and 10 reporting a PMI/RI. The sizes of CSR bitmaps (the number of CSR bits) that are supported in the TMs is shown in Table 2.

TABLE 2

| | Number of bits $A_c$ | | |
|---|---|---|---|
| | 2 antenna ports | 4 antenna ports | 8 antenna ports |
| Transmission mode 3 | 2 | 4 | |
| Transmission mode 4 | 6 | 64 | |
| Transmission mode 5 | 4 | 16 | |
| Transmission mode 6 | 4 | 16 | |
| Transmission mode 8 | 6 | 64 with alternativeCodeBookEnabledFor4TX-r12=TRUE configured, otherwise 32 | |
| Transmission modes 9 and 10 | 6 | 96 with alternativeCodeBookEnabledFor4TX-r12=TRUE configured, otherwise 64 | 109 |

The bitmaps are configured as $[a_{A_c-1} \ldots a_1 a_0]$. $a_0$ is a least significant bit (LSB) and $a_{A_c-1}$ is a most significant bit (MSB). In the bitmaps, the bit indicated by 0 means that a precoder indicated by corresponding PMI and RI is not used to create channel information That is, a base station notifies a terminal of the bitmap $[a_{A_c-1} \ldots a_1 a_0]$ through a higher layer signal (RRC message), whereby it can limit codebook indexes that a terminal can select. As an embodiment of the bitmaps, when a base station configures eight antenna ports in the TM 9 or TM 10, bits may be mapped to PMI1($i_1$) and PMI2($i_1$), as follows. Referring to Table 2, when eight antenna ports are configured in the TM9 or TM 10, $A_c$=109. Whether to use precoders that can be designated by v layers (v∈{1,2,3,4,5,6,7,8}) and a codebook index $i_1$ is designated by $a_{f1(v-1)+i_1}$ of the bitmaps. $f1(\cdot)=\{0,16,32,36,40,44,48,52\}$. Whether to use precoders that can be designated by v layers (v∈{1,2,3,4}) and a codebook index $i_2$ is designated by $a_{53+g1(v-1)+i_2}$ of the bitmaps. $g1(\cdot)=\{0,16,32,48\}$.

A second codebook selection restriction function is codebook subsampling. The periodic feedback information of the terminal is transmitted to a base station through a PUCCH. The amount of information that can be transmitted at a time through the PUCCH is limited, so various items of feedback information such as the RI, wCQI, sCQI, PMI1, wPMI2, and sPMI2 may be transmitted through the PUCCH by subsampling or two or more items of feedback information may be encoded together (hereafter, referred to as 'joint encoding') and transmitted through the PUCCH. For example, when the number of CSI-RS ports configured by a base station is 8, an RI and a PMI1 that are reported in a submode 1 of a PUCCH feedback mode 1-1 may be joint-encoded as shown in Table 3. On the basis of Table 3, an RI composed of 3 bits and a PMI1 composed of 4 bits are joint-encoded into a total of 5 bits.

TABLE 3

| Value of joint encoding of RI and the first PMI $I_{RI/PMI1}$ | RI | Codebook index $i_1$ |
|---|---|---|
| 0-7 | 1 | $2I_{RI/PMI1}$ |
| 8-15 | 2 | $2(I_{RI/PMI1}-8)$ |
| 16-17 | 3 | $2(I_{RI/PMI1}-16)$ |
| 18-19 | 4 | $2(I_{RI/PMI1}-18)$ |
| 20-21 | 5 | $2(I_{RI/PMI1}-20)$ |
| 22-23 | 6 | $2(I_{RI/PMI1}-22)$ |
| 24-25 | 7 | $2(I_{RI/PMI1}-24)$ |
| 26 | 8 | 0 |
| 27-31 | reserved | NA |

As another example, when the number of CSI-RS ports configured by a base station is 8, a PMI2 that is reported in a PUCCH feedback mode 2-1 may be subsampled as shown in Table 4. Referring to Table 4, the PMI2 is reported as 4 bits when the related RI is 1. However, when the related RI is 2 or more, a differential CQI for the second code word should be additionally reported together, it can be seen that the PMI2 is subsampled into 2 bits and reported. In common mobile communication systems, it is possible to apply subsampling or joint encoding to a total of six kinds of periodic feedback including Table 3 and Table 4.

TABLE 4

| | Relationship between the second PMI value and codebook index $i_2$ | |
|---|---|---|
| RI | Value of the second PMI $I_{PMI2}$ | Codebook index $i_2$ |
| 1 | 0-15 | $I_{PMI2}$ |
| 2 | 0-3 | $2I_{PMI2}$ |
| 3 | 0-3 | $8 \cdot \lfloor I_{PMI2}/2 \rfloor + (I_{PMI2} \bmod 2) + 2$ |
| 4 | 0-3 | $2I_{PMI2}$ |
| 5 | 0 | 0 |
| 6 | 0 | 0 |
| 7 | 0 | 0 |
| 8 | 0 | 0 |

Figure 6:
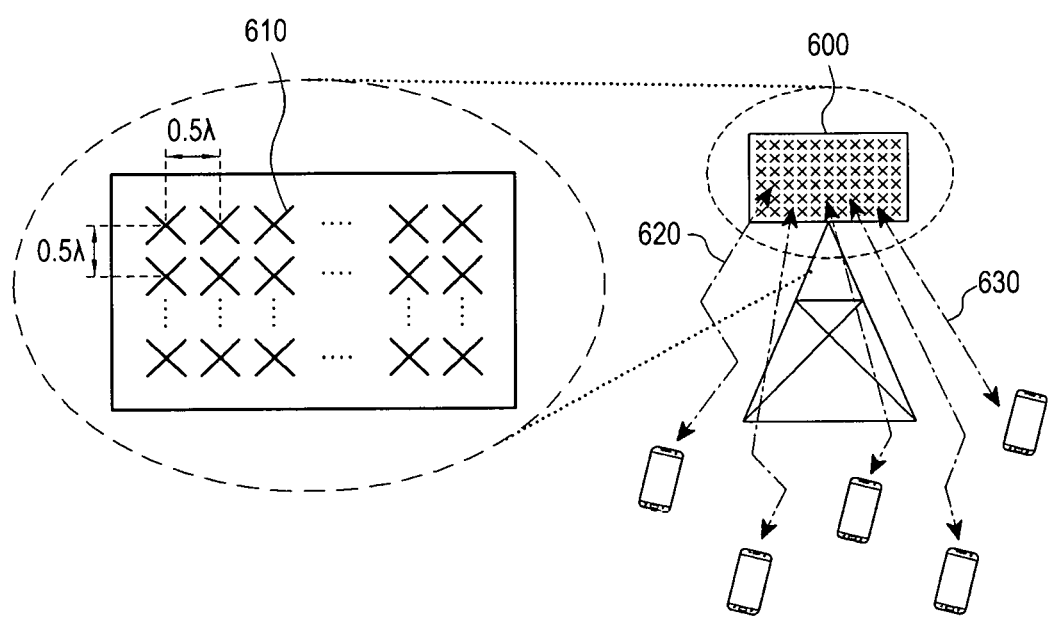
FIG. 6 is a diagram schematically showing an FD-MIMO system.

FIG. 6 is a diagram schematically showing an FD-MIMO system.

Referring to FIG. 6, a base station transmission device 600 transmits radio signals, using eight or more transmission antennas. A plurality of transmission antennas 110 is disposed with a minimum distance maintained therebetween. The minimum distance, for example, may be a half the wavelength of a transmitted radio signal. In general, when a distance that is a half the wavelength of a radio signal is maintained between the transmission antennas, the signals transmitted through the transmission antennas are influenced by radio channels having low correlation. For example, when the band of a transmitted radio signal is 2 GHz, the distance is 7.5 cm, and when the band is increased higher than 2 GHz, the distance is shortened.

In FIG. 6, the eight transmission antennas disposed at the base station transmission device 600 are used to transmit signals 120 and 130 to one or a plurality of terminals. Appropriate precoding is applied to the transmission antennas so that signals are simultaneously transmitted to a plurality of terminals. One terminal can receive one or more information streams. In general, the number of information streams that one terminal can receive is determined on the basis of the number of reception antennas of the terminal and a channel situation.

In FD-MIMO, it is required to estimate channel state information between a base station and a terminal by transmitting eight or more CSI-RSs. To this end, a method of configuration one or more, that is, two, four, or eight CSI-RS patterns on a terminal and combining the configured CSI-RS patterns to receive eight or more CSI-RS ports may be used. Alternatively, a method of applying a specific beam to a plurality of transceiver units (TXRU) such that a terminal recognizes the TXRUs as one CSI-RS port may be used. Hereafter, this is referred to as BF (beamforming) CSI-RS. When a base station knows the channel information of a terminal in advance, the base station can configure a small number of CSI-RSs, to which a beam suitable for the channel information has been applied, to its TXRUs. As another example, the base station can configure a plurality of CSI-RS resources including eight or less CSI-RS ports. The base station can beamform the CSI-RS ports by applying different-directional beams to the CSI-RS resources.

Figure 7:
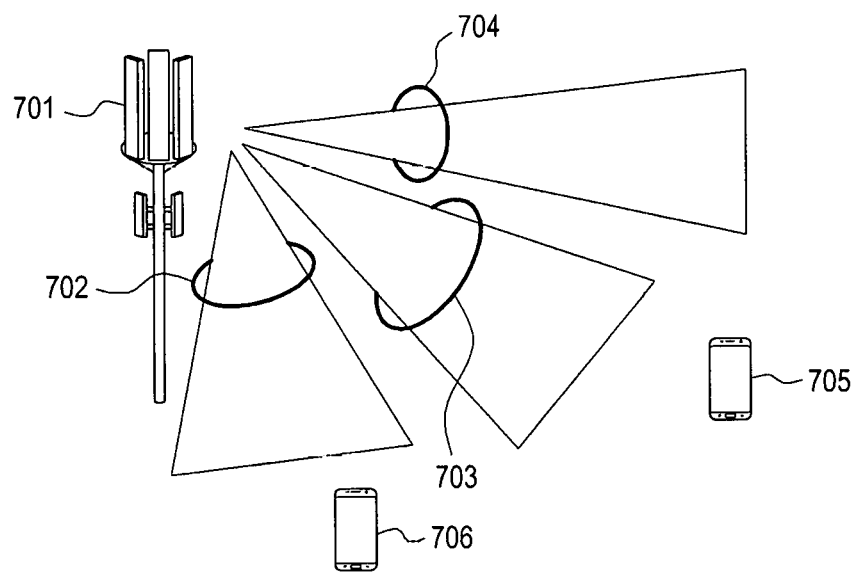
FIG. 7 is a diagram showing an example of operating BF CSI-RSs.

FIG. 7 is a diagram showing an example of operating a BF CSI-RSs.

Referring to FIG. 7, a base station 701 can transmit three CSI-RSs 702, 703, and 704 beamformed in different directions to terminals 705 and 706. The resources that respectively correspond to the three CSI-RSs 702, 703, and 704 may be configured to correspond to one or more CSI-RS ports. The terminals 705 and 706 can create channel state information for the configured CSI-RSs 702, 703, and 704 and report the index of CSI-RS resources that they prefer to a base station. In the embodiment shown in FIG. 7, the terminal 705 would be likely to prefer the resource of the CSI-RS 703 and the terminal 706 is likely to prefer the resource of the CSI-RS 702.

As described above, a base station can configure a plurality of CSI-RS resources composed of a plurality of different CSI-RS ports in the same situation, as exemplified in FIG. 7. When the base station wants to configure CSR to a terminal, referring to Table 2, it is apparent that different CSR configurations should be transmitted for CSI-RS resources, respectively. For example, when the resource of the CSI-RS 703 shown in FIG. 7 is composed of eight CSI-RS ports and the resource of the CSI-RS 704 is composed of four CSI-RS ports, the CSR information that a terminal refers to is as follows on the basis of Table 2. That is, when a terminal creates channel information based on the resource of the CSI-RS 703, CSR information composed of 109 bits may be referenced, and when the terminal creates channel information based on the resource of the CSI-RS 704, CSR information composed of 64 or 96 bits may be referenced. Even though the CSI-RS resources are configured to be composed of the same number of CSI-RS ports, it may be required to configure different CSR in accordance with the CSI-RS resources. For example, it is assumed that the CSI-RS 702 has been beamformed toward a cell-center and the CSI-RS 704 has been beamformed toward a cell-edge. In this case, the amount of interference of the CSI-RS 702 and the CSI-RS 704 by adjacent cells and the amount of interference to adjacent cells are different, so the base station 701 may need to apply different CSR to the CSI-RS 702 and the CSI-RS 704.

As described above, a base station is required to notify a terminal of various kinds of CSR in order to effectively achieve BF CSI-RSs in the FD-MIMO system. A terminal receiving the CSR information can discriminate code points (or codebook elements) that can be referenced and code points that cannot be referenced when channel state information is created from the CSI-RS resources, using the CSR information. On the basis of this, the base station can instruct the terminal to report channel state information (CSI) to which different conditions are applied, depending on the CSI-RS resources. Since CSR is configured by a very large bitmap, it may be a large burden to configure a several CSRs in upper layer signaling such as an RRC message.

Accordingly, an embodiment proposes a method of applying CSR for effectively operating BF CSI-RSs based on a plurality of CSI-RS resources. According to an embodiment, CSR information may be configured for each CSI-RS resource, depending on situations, grouped and configured on the basis of the number of ports included in CSI-RS resources, instructed to follow codebook subsampling for PUCCH reporting, or agreed to be understood in a type combined in accordance with a predetermined rule. In accordance with an embodiment, a base station can configure CSR for BF CSI-RS signals in consideration of burden in higher layer signaling such as an RRC message and the performance of a system.

An embodiment is described in detail hereafter.

[Embodiment of Configuring CSR for Each CSI-RS Resource]

According to an embodiment, when a BF CSI-RS composed of a plurality of 2-/4-/8-port CSI-RS resources is operated, CSR can be individually configured to correspond to the 2-/4-/8-port CSI-RS resources. Configuring a plurality of CSI-RS resources for BF CSI-RS signals means that the CSI-RS resources are configured in one CSI process and a terminal is configured to report the index of a CSI-RS resource, which it prefers, of the CSI-RS resources to a base station.

Figure 8:
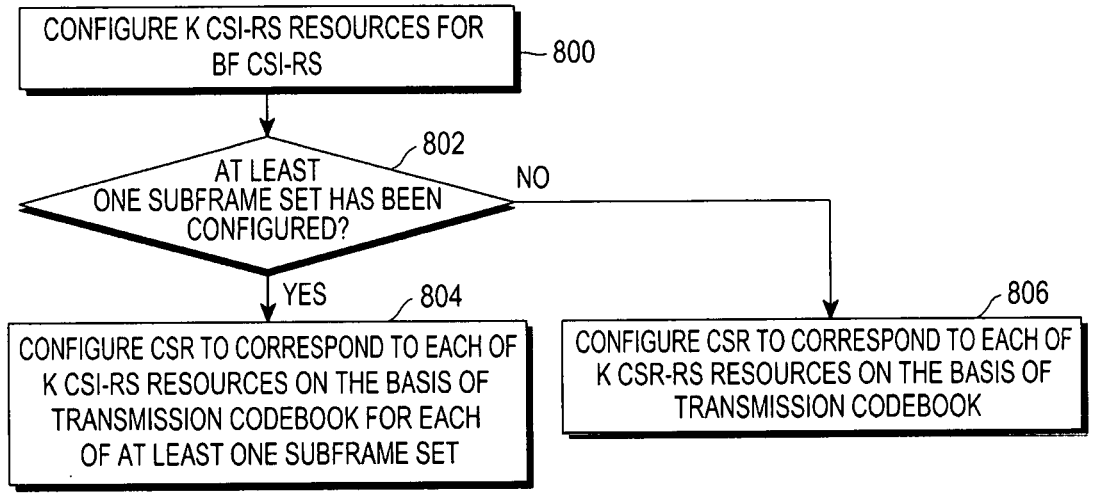
FIG. 8 is a flowchart showing a method in which a base station according to an embodiment configures CSR for each CSI-RS resources.

FIG. 8 is a flowchart showing a method in which a base station according to an embodiment configures CSR for each CSI-RS resources.

Referring to FIG. 8, the base station configures K CSI-RS resources for a BF CSI-RS in step 800 (K>0). The base station determines whether at least one subframe set for measuring the K CSI-RS resources has been configured in step 802. When at least subframe set is configured, the base station configures CSR respectively corresponding to K CSI-RS resources on the basis of a transmission codebook for the subframe set in step 804. For example, when subframe sets $C_{CSI,0}$ and $C_{CSI,1}$ are configured by a higher layer, the base station can configure CSR for the $C_{CSI,0}$ and $C_{CSI,1}$.

When K CSI-RS resources are configured for a BF CSI-RS, a total of 2K items of CSR information may be included in one CSI process. For example, it assumed that the base station CSI-RS resources of K=5 and the CSI-RS resources respectively correspond 2-port, 2-port, 4-port, 4-port, and 8-port antenna ports.

In this case, according to an embodiment, when at least one subframe set is not configured and a 3GPP Rel.12 4Tx codebook is used, the numbers of CRS bits configured in the CSI-RS resources are 6 bits, 6 bits, 96 bits, 96 bits, and 109 bits, so a total of 313 bits can be used for configuration the whole CSR.

If subframe sets $C_{CSI,0}$ and $C_{CSI,1}$ are configure by a higher layer and a 3GPP Rel.12 4Tx codebook is used, the numbers of CSR bits configure in the CSI-RS resources are 2·6 bits, 2·6 bits, 2·96 bits, 2·96 bits, and 2·109 bits, so a total of 626 bits can be used to configure the whole CSR.

[Embodiment of Configuring CSR for CRS-RSs Having the Same Number of Antenna Ports]

According to an embodiment, when a BF CSI-RS composed of a plurality of 2-/4-/8-port CSI-RS resources is operated, CSR resources including the same number of CSI-RS ports of the 2-/4-/8-port CSI-RS resources can share CRS configuration. Configuring a plurality of CSI-RS resources for BF CSI-RS signals means that the CSI-RS resources are configured in one CSI process and a terminal is configured to report the index of a CSI-RS resource, which it prefers, of the CSI-RS resources to a base station.

Figure 9:
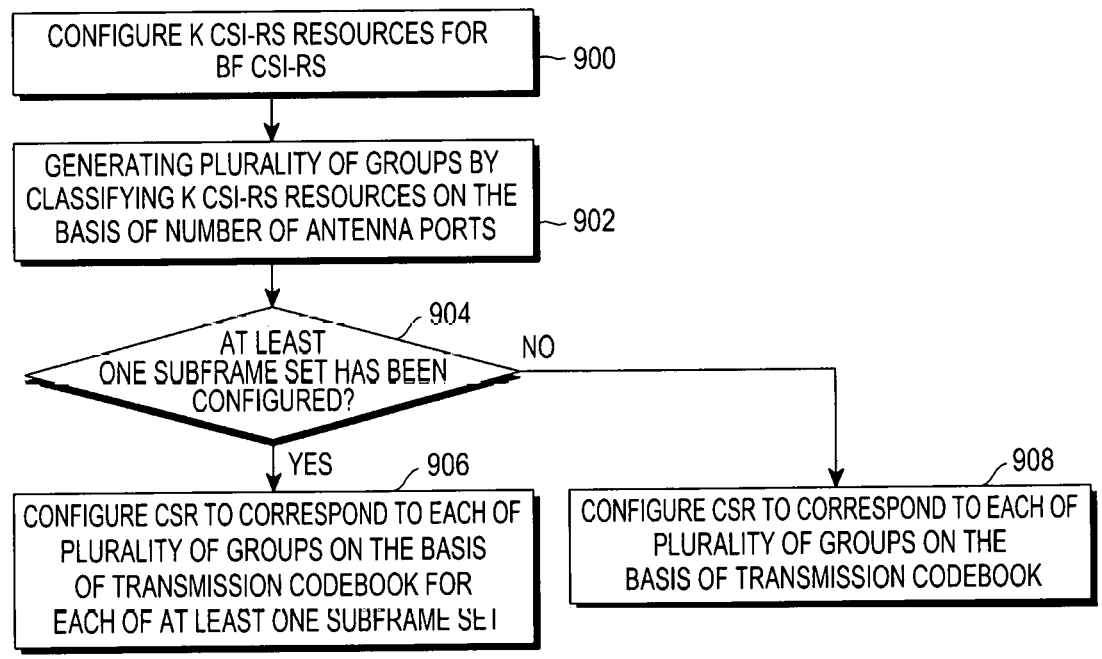
FIG. 9 is a flowchart showing a method in which a base station according to an embodiment configures CSR for CSI-RSs having the same number of antenna ports.

FIG. 9 is a flowchart showing a method in which a base station according to an embodiment configures CSR for CSI-RSs having the same number of antenna ports.

Referring to FIG. 9, the base station configures K CSI-RS resources for a BF CSI-RS in step 900 (K>0). The base station 902 creates a plurality of groups by classifying the K CSI-RS resources on the basis of the number of antenna ports. For example, when the base station configures CSI-RS resources of K=5 and the CSI-RS resources correspond to 2-port, 2-port, 4-port, 4-port, and 8-port antenna ports, a first group, a second group, and a third group of CSI-RSs corresponding to the number of antenna ports (2-port, 2-port), (4-port, 4-port), and (8-port), respectively, can be created.

The base station determines whether at least one subframe set for measuring K CSI-RS resources has been configured in step 904. When at least subframe set is configured, the base station configures CSR respectively corresponding to the groups on the basis of a transmission codebook for the subframe set in step 906. For example, when subframe sets $C_{CSI,0}$ and $C_{CSI,1}$ are configured by a higher layer, the base station can configure CSR for the $C_{CSI,0}$ and $C_{CSI,1}$. When at least subframe set is not configured, the base station configures CSR respectively corresponding to the groups on the basis of a transmission codebook in step 908.

When K CSI-RS resources are configured for a BF CSI-RS, a total of 2K items of CSR information may be included in one CSI process. For example, it assumed that the base station CSI-RS resources of K=5 and the CSI-RS resources respectively correspond 2-port, 2-port, 4-port, 4-port, and 8-port antenna ports.

In this case, according to an embodiment, when at least one subset frame is not configured and a 3GPP Rel.12 4Tx codebook is used, two 2-port CSI-RS resources share one 6-bit CSR configuration, two 4-port CSI-RS resources share one 96-bit CSR configuration, and one 8-port CSI-RS resource uses one 109-bit CSR configuration. In this case, the numbers of bits for configuration CSR are 6 bits, 96 bits, and 109 bits, so a total of 211 bits are used for configuration CSR.

If subframe sets $C_{CSI,0}$ and $C_{CSI,1}$ are configured by a higher layer and a 3GPP Rel.12 4Tx codebook is used, the numbers for configuring CSR are 2.6 bits, 2.96 bits, and 2.109 bits, so a total of 422 bits can be used to configure the whole CSR.

As another example of the embodiment, each CSR may have its own CSR configuration ID. In this case, the number of CSR configurations may be different from the number of CSI-RS resources and the CSI-RS resources each include a CSR configuration ID, so it is possible to notify a terminal that which CSR configuration should be referenced when generating channel state information on the basis of the CSI-RS resources.

[Embodiment of Configuring CSR in Accordance with a Predetermined Rule]

According to an embodiment, when a BF CSI-RS composed of a plurality of 2-14-18-port CSI-RS resources is operated, 2-14-18-port CSI-RS resources can designate code points that can be used to create CSIs according to a new method of configuring CSR.

An example of the new method of configuring CSR is to borrow a portion of codebook subsampling that is used for periodic CSI reporting for aperiodic CSI reporting. Referring to Table 3 and 4, it can be seen that available code points are designated in PUCCH reporting that is periodically transmitted, by a predetermined rule. In common communication systems, fragmentation for PMIs such as a first PMI, a second PMI, and a third PMI is supported, so it is possible to control the pressure in higher layer signaling for configuring CSR by applying predetermined a subsampling rule to some of the PMIs.

Figure 10:
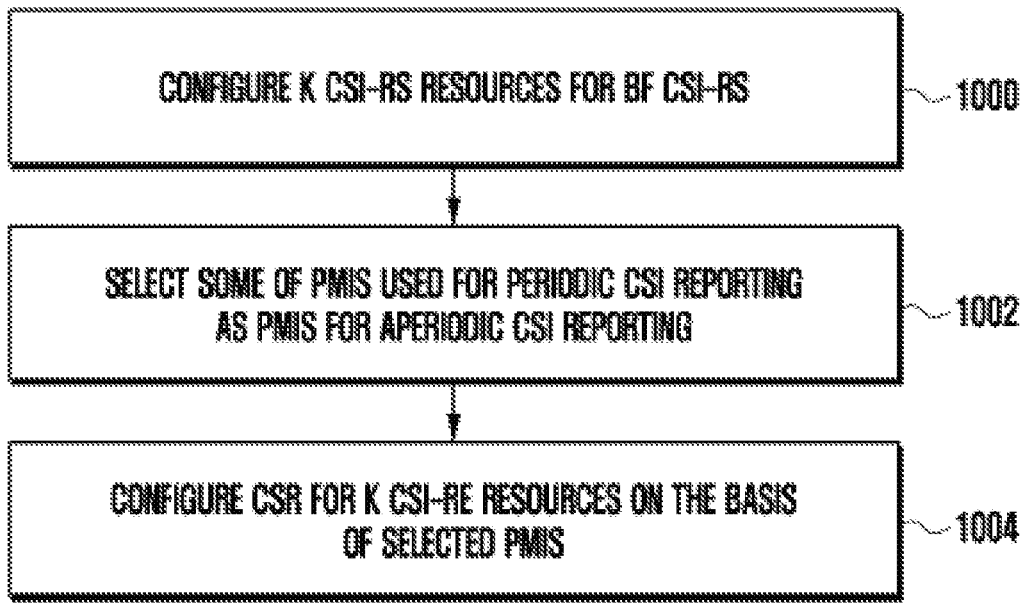
FIG. 10 is a flowchart showing a method in which a base station according to an embodiment configures a CRS in accordance with a subsampling rule.

FIG. 10 is a flowchart showing a method in which a base station according to an embodiment configures a CRS in accordance with a subsampling rule;

Referring to FIG. 10, the base station configures K CSI-RS resources for a BF CSI-RS in step 1000 (K>0). The base station selects some of PMIs that are used for periodic CSI reporting as PMIs for aperiodic CSI reporting in accordance with a predetermined rule in step 1002. Next, the base station configures CSR for the K CSI-RS resource on the basis of the selected PMIs.

Another example of the method of configuration new CSR is to combine different CSR configuration into one in accordance with a predetermined rule. This will be described in detail with reference to FIG. 11.

Figure 11:
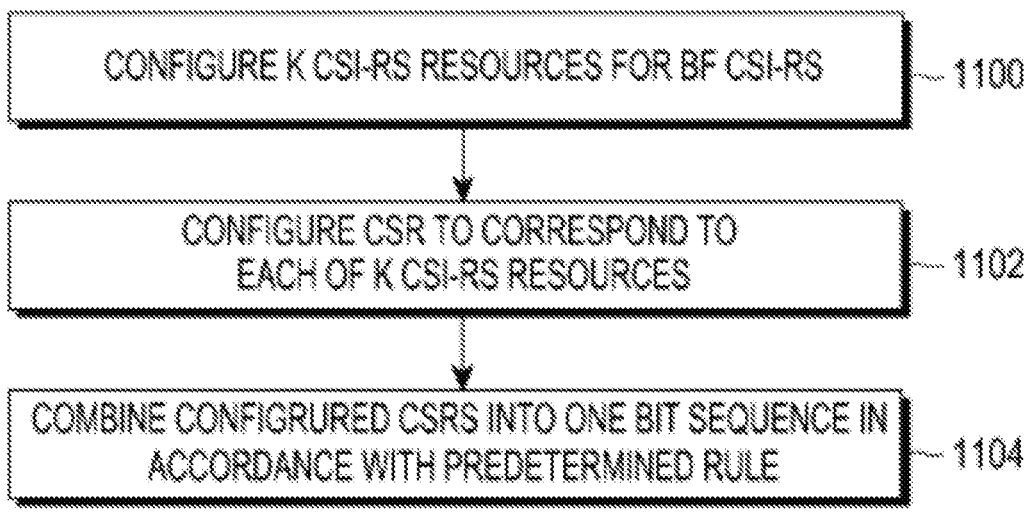
FIG. 11 is a flowchart showing a method in which base station according to an embodiment combines different CSR configurations into one bit sequence.

FIG. 11 is a flowchart showing a method in which base station according to an embodiment combines different CSR configurations into one bit sequence;

Referring to FIG. 11, the base station configures K CSI-RS resources for a BF CSI-RS in step 1100 (K>0). The base station configures CRS to correspond to the K CSI-RS in step 1102 and combines the CSR into one bit sequence in accordance with a predetermined rule in step 1104.

The rule for combining different CSR configurations may be based on code points that can be used for configuration the CSR. For example, it is assumed that three CSI-RS resources have been configured and available code points are designated to the resources by CSR bit sequences A=[1 0], B=[0 0 1 1], and C=[0 0 0 0 1 1 0 1]. The lengths of the CSR bit sequences were freely adjusted for the convenience of description. In an embodiment, the combination reference for configuring CSR is the available code points, so the CSR bit sequence combined on the basis of exclusive OR is A+B+C=[1 0 1 1 1 1 0 1]. In an embodiment, the reference of combination is configured on the basis of the left bit (LSB) of CSR, but is not limited thereto. If a terminal prefers the first CSI-RS resource, it is possible to extract A'=[1 0] from the combined CSR bit sequence and create a CSI by referring to A'=[1 0]. Similarly, if a terminal prefers the second CSI-RS resource, it is possible to extract B'=[1 0 1 1] from the combined CSR bit sequence and create a CSI by referring to B'=[1 0 1 1]. If a terminal prefers the third CSI-RS resource, it is possible to extract C'=A+B+C from the combined CSR bit sequence and create a CSI by referring to C'=A+B+C.

Another rule for combining different CSR configurations may be based on code points that cannot be used for configuration the CSR. For example, it is assumed that three CSI-RS resources have been configured and available code points are designated to the resources by CSR bit sequences A=[1 0], B=[1 1 1 1], and C=[1 0 0 0 1 1 0 1]. The lengths of the CSR bit sequences were freely adjusted for the convenience of description. In an embodiment, the combination reference for configuration CSR is the unavailable code points, so the CSR bit sequence combined on the basis of exclusive NOR is A+B+C=[1 0 0 0 1 1 0 1]. In an embodiment, the reference of combination is configured on the basis of the left bit (LSB) of CSR, but is not limited thereto. If a terminal prefers the first CSI-RS resource, it is possible to extract A'=[1 0] from the combined CSR bit sequence and create a CSI by referring to A'=[1 0]. Similarly, if a terminal prefers the second CSI-RS resource, it is possible to extract B'=[1 0 0 0] from the combined CSR bit sequence and create a CSI by referring to B'=[1 0 0 0]. If a terminal prefers the third CSI-RS resource, it is possible to extract C'=A+B+C from the combined CSR bit sequence and create a CSI by referring to C'=A+B+C.

Another rule for combining different CSR configurations may be the number of CSI-RS ports included in CSI-RS resources that the CSR configurations refer to. For example, priority of the CSR configuration may be determined in accordance with ascending power or descending power of the number of CSI-RS ports included in the CSI-RS resources. For example, it is assumed that three CSI-RS resources have been configured and available code points are designated to the CSI-RS resources by CSR bit sequences A=[1 0], B=[1 1 0 1], and C=[1 0 1 0 1 1 0 1]. The lengths of the CSR bit sequences were freely adjusted for the convenience of description. It can be assumed that the first CSI-RS resource is composed of two CSI-RS ports, the second resource is composed of four ports, the third resource is composed of eight ports, and the smaller the number of CSI-RS ports, the higher the priority of the CSR configurations. In this case, the combined CSR bit sequence is A+B+C=[1 0 0 1 1 1 0 1]. In this example, the reference of combination is configured on the basis of the left bit (LSB) of CSR, but is not limited thereto. If a terminal prefers the first CSI-RS resource, it is possible to extract A'=[1 0] from the combined CSR bit sequence and create a CSI by referring to A'=[1 0]. Similarly, if a terminal prefers the second CSI-RS resource, it is possible to extract B'=[1 0 0 0] from the combined CSR bit sequence and create a CSI by referring to B'=[1 0 0 0]. If a terminal prefers the third CSI-RS resource, it is possible to extract C'=A+B+C from the combined CSR bit sequence and create a CSI by referring to C'=A+B+C.

Embodiments and examples described herein are not independent from each other and can be used in combinations thereof.

A massive MIMO or an FD-MIMO system to which the technology proposed in an embodiment is applied is composed of eight or more two-dimensionally arranged antennas.

Figure 12:
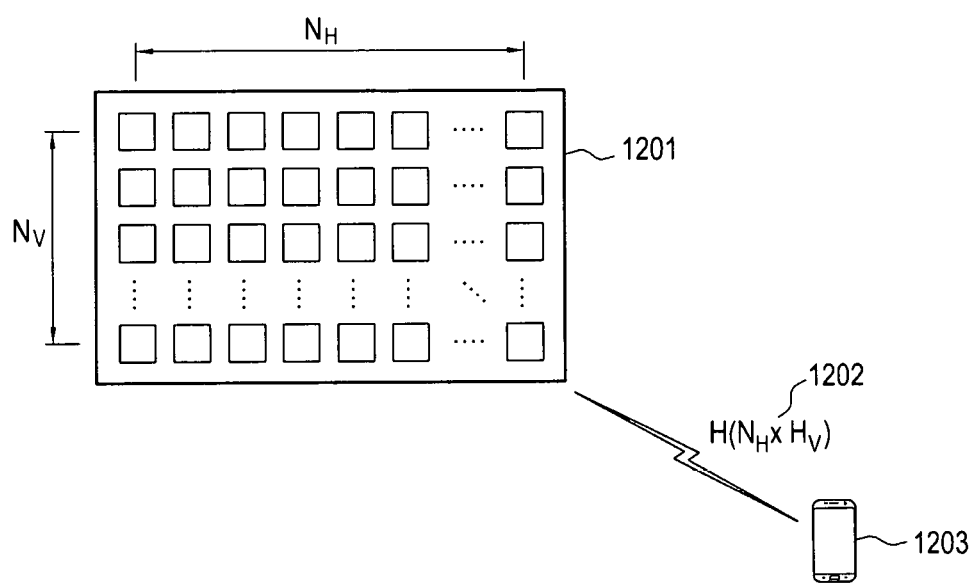
FIG. 12 is a diagram showing an FD-MIMO system according to an embodiment.

FIG. 12 is a diagram showing an FD-MIMO system according to an embodiment.

Referring to FIG. 12, a base station transmission device 1201 transmits radio signals, using tens of or more transmission antennas. The transmission antennas are disposed with a predetermined distance maintained therebetween, as shown in FIG. 12. For example, the predetermined distance may correspond to a multiple of the half of the wavelength of a transmitted radio signal. In general, when a distance that is a half the wavelength of a radio signal is maintained between the transmission antennas, the signals transmitted through the transmission antennas are influenced by radio channels having low correlation. The larger the distance between transmission antennas, the lower the correlation between signals.

In the base station transmission device 1201 having a large number of antennas, the antennas may be two-dimensionally arranged, as shown in FIG. 12, to prevent a large increase of the scale of the base station transmission device 1201. In this case, a base station transmits signals, using the base station transmission device 1201 in which NH transmission antennas arranged on the horizontal axis and Nv transmission antennas arranged on the vertical axis, and a terminal 103 has to measure a channel 120 for a corresponding transmission antenna.

In FIG. 12, tens of or more transmission antennas disposed at the base station transmission device are used to transmit signals to one or more terminals. Appropriate precoding is applied to the transmission antennas so that signals are simultaneously transmitted to the terminals. One terminal can receive one or more information streams. In general, the number of information streams that one terminal can receive is determined on the basis of the number of reception antennas of the terminal and a channel situation.

In order to effectively achieve the FD-MIMO system, a terminal has to accurately measure a channel situation and the intensity of interference between transmission and reception antennas, using a plurality of reference signals, and transmit effective channel state information to a base station, using the measured factors. The base station receiving the channel state information determines which terminals it performs transmission to in relation to downlink transmission, which speed it performs transmission at, which precoding it applies, etc., using the received channel state information. In the FD-MIMO system there are many transmission and reception antennas, so when a method of transmitting and receiving channel state information for common mobile communication system is applied, a lot of control information should be transmitted through an uplink, so uplink overhead is generated.

In a mobile communication system, time, frequency, and power sources are limited. Accordingly, when more resources are assigned to a reference signal, the resources that can be assigned for traffic channel (data traffic channel) transmission are reduced, the absolute amount of data to be transmitted is reduced. In this case, although the channel measurement and estimation performance would be improved, but the absolute amount of data to be transmitted is reduced, so the capacity performance of the entire system may be deteriorated.

Accordingly, it is required to appropriately distribute the resources for the reference signal and the resources for the traffic channel transmission in order to induce optimum performance in terms of the capacity performance of the entire system. Accordingly, in an embodiment, there are proposed a method and device in which a base station notifies a terminal of configuration information about a plurality of CSI-RSs and the terminal generates feedback information in accordance with the configuration information in order to perform high-efficiency data transmission and reception in an FD-MIMO system.

In particular, in an embodiment, there are proposed a method and device for transmitting and receiving at least one CSI-RS in a Downlink Pilot Time Slot (DwPTS), using resources that are determined on the basis of a special subframe configuration.

[Method of Configuring CSI-RS and CMR at a DwPTS when Normal CP is Used]

Figure 13:
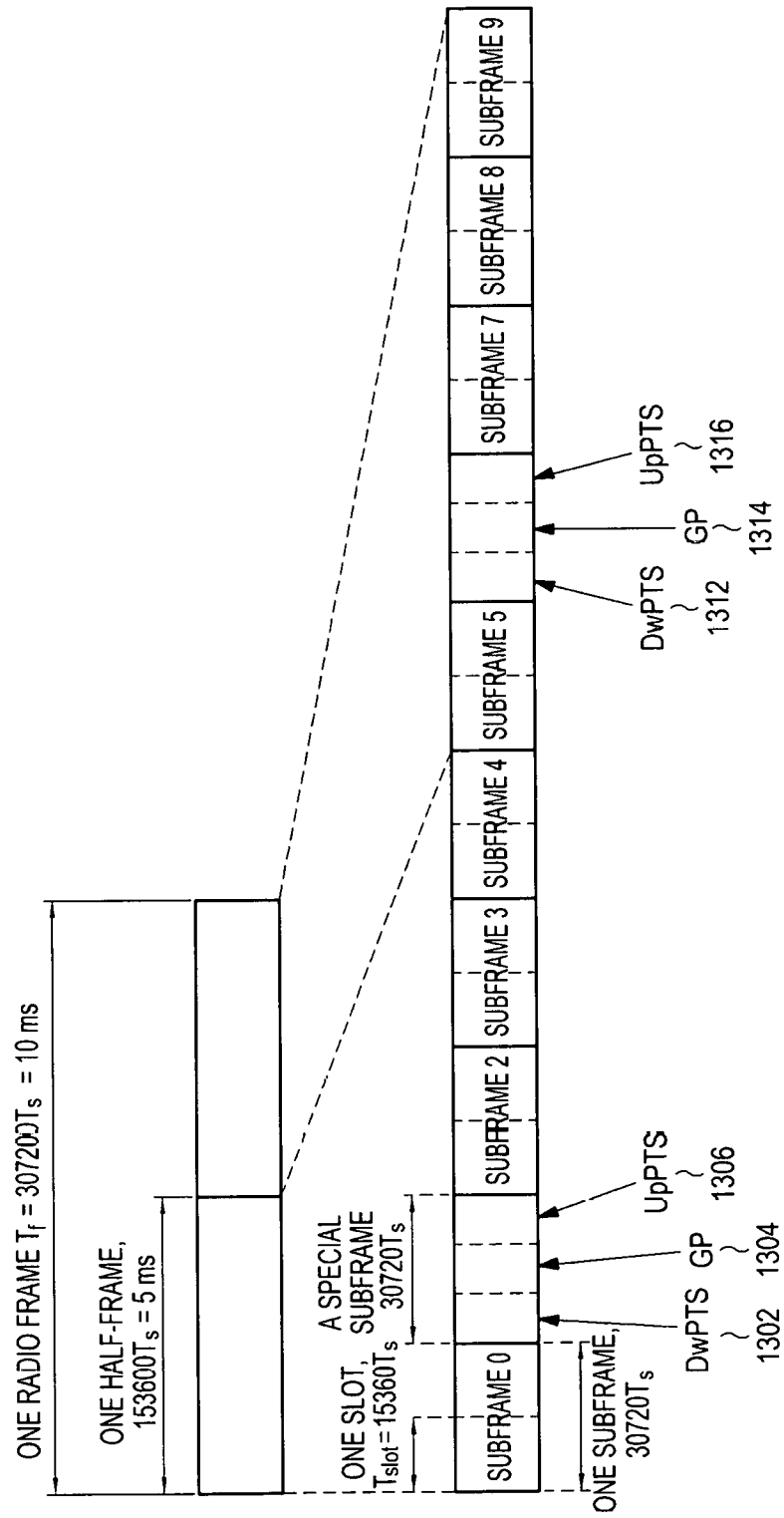
FIG. 13 is a diagram showing a TDD frame structure according to an embodiment.

In common mobile communication systems, both of an FDD method and a TDD method are supported. A frame structure for the TDD method, as shown in FIG. 13, controls interference that may be generated when switching from a downlink to an uplink by including a special subframe composed of a DwPTS (1302, 1312), a guard period (GP) (1304, 1314), and an Uplink Pilot Time Slot (UpPTS) (1306, 1316) in a subframe #1 and a subframe #6.

In the TDD frame structure, an uplink subframe, a downlink subframe, and a special subframe are determined on the basis of uplink-downlink configuration information showing an uplink-downlink configuration indicated by a higher layer shown in the following Table 5. Referring to Table 5, when the uplink-downlink configuration is configured as 0, there are only two downlink subframes, so it can be seen that the degree of freedom for configuring CSI-RSs is remarkably reduced, as compared with when the FDD method is used. Further, the degree of freedom for configuring CSI-RSs will be further reduced, considering that a Physical Broadcast Channel (PBCH) should be considered in the subframe #0. In this case, it is possible to secure the degree of freedom for configuring CSI-RSs through CSI-RS transmission at the DwPTS (1302, 1312).

TABLE 5

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In common mobile communication systems, a total of nine methods of configuring a common cycle prefix (CP) are provided and a total of seven methods of configuring an extended CP are provided for a special subframe in the following Table 6. Referring to Table 6, the number of downlink OFDM included in a DwPTS may depend on a special subframe configuration. In consideration of this fact, DMRS REs at different positions may be used in accordance with the special subframe configuration, like the resource elements (RE) indicated by hatching lines in FIGS. 14 and 15.

Figure 14:
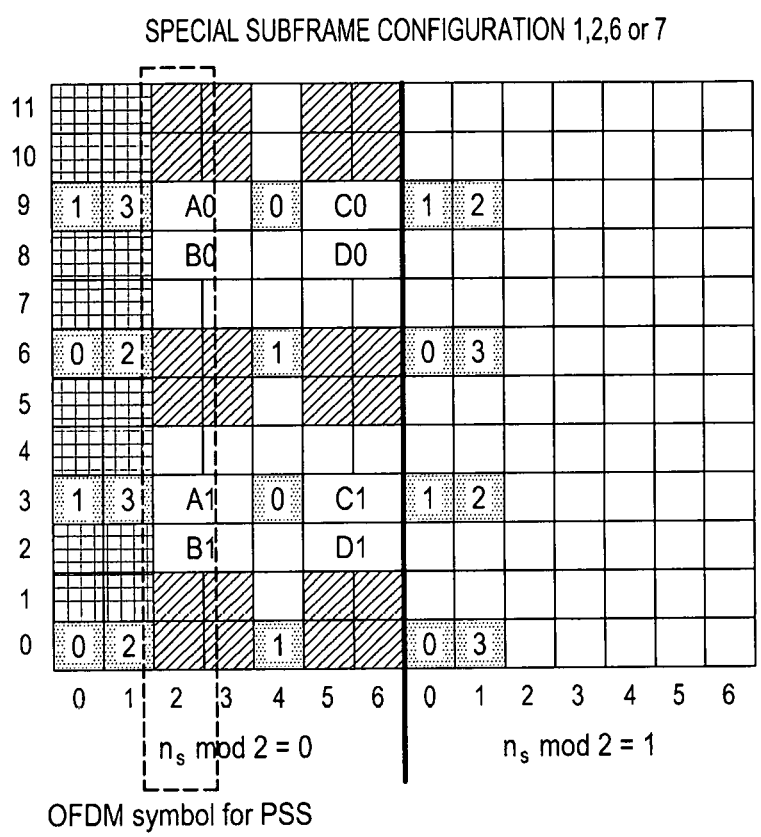
FIG. 14 is a diagram showing a DMRS RE when a normal CP according to an embodiment is configured and a special subframe configuration is set as 1, 2, 6, or 7.

For example, when a special subframe configuration is set as 1, 2, 6, or 7 in a normal CP, DMRS REs exist at the second, third, fifth, and sixth OFDM symbols of the slot 0, as shown in FIG. 14. However, when a special subframe configuration is set as 3, 4, 8, or 9 in a normal CP, DMRS REs exist at the second and third OFDM symbols of the slot 0 and the second and third OFDM symbols of the slot 1, as shown in FIG. 15.

Assuming that a CSI-RS design as in a common subframe is applied to the OFDM symbols having a DMRS, when the special subframe configuration is set as 1, 2, 6, or 7 in a normal CP, CSI-RS RE candidates are sixteen REs indicated by A0, A1, B0, B1, C0, C1, D0, and D1 in FIG. 14. A Primary Synchronization Signal (PSS) is transmitted at the second OFDM symbol of the slot 0 at the DwPTS, so A0, A1, B0, and B1 shown in FIG. 14 cannot be used for CSI-RS transmission. Accordingly, in FIG. 14, the REs to which a CSI-RS can be actually transmitted are eight REs indicated by C0, C1, D0, and D1.

Figure 15:
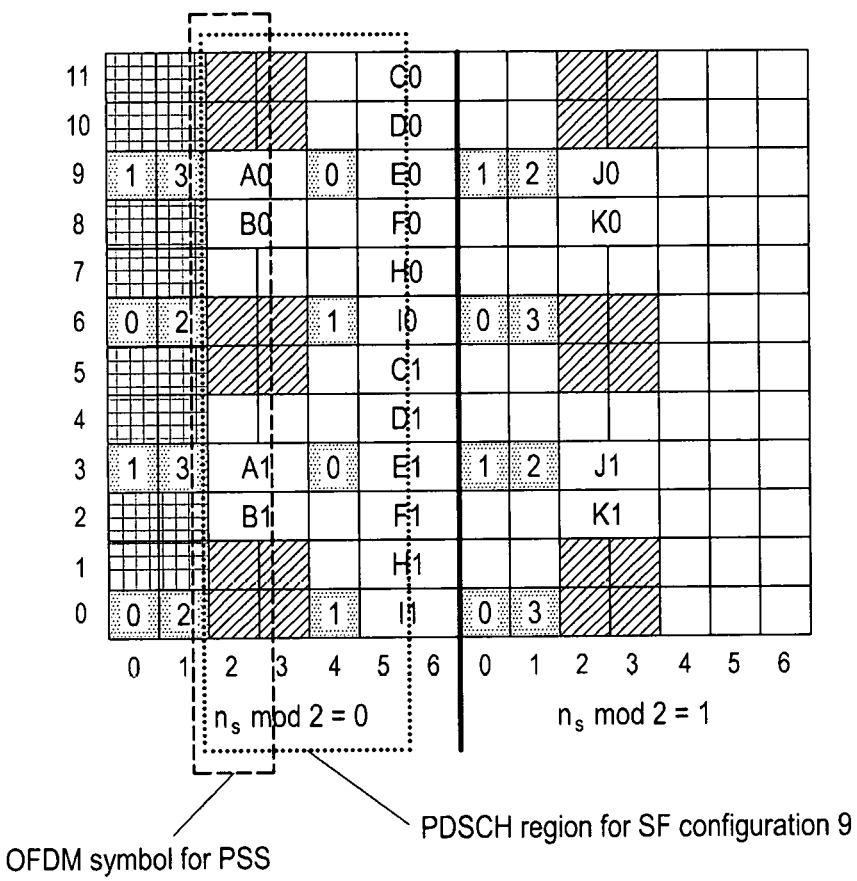
FIG. 15 is a diagram showing a DMRS RE when a normal CP according to an embodiment is configured and a special subframe configuration is set as 3, 4, 8, or 9.

As another embodiment, when the special subframe configuration is set as 3, 4, 8, or 9 in a normal CP, CSI-RS RE candidates are forty REs indicated by A0, A1, B0, B1, C0, C1, D0, D1, . . . , K0, and K1 shown in FIG. 15. A PSS is transmitted at the second OFDM symbol of the slot 0 at the DwPTS, so A0, A1, B0, and B1 shown in FIG. 15 cannot be used for CSI-RS transmission. In particular, when the special subframe configuration is set as 9, only the first to fifth OFDM symbols of the slot 0 can be used as DwPTSs, so the resources of C0, C1, . . . , K1 also cannot be used for CSI-RS transmission. Accordingly, in the embodiment shown in FIG. 15, the REs to which CSI-RS can be actually transmitted are thirty two REs indicated by C0, C1, D0, D1, . . . , K1 when the special subframe configuration is set as 3, 4, or 8, and there is no RE when the special subframe configuration is set as 9.

Figure 16:
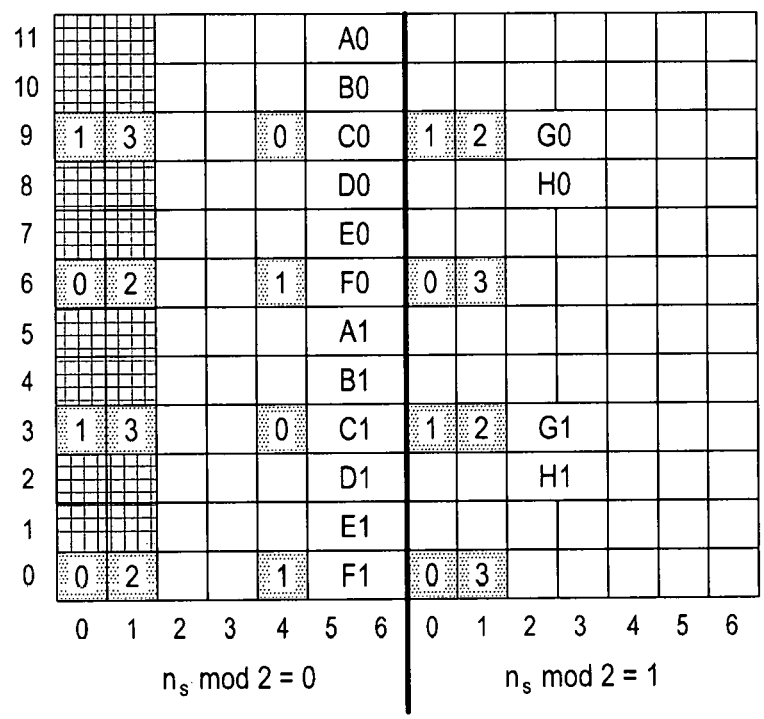
FIG. 16 is a diagram showing a DMRS RE when a normal CP according to an embodiment is configured and a special subframe configuration is set as 1, 2, 3, 4, 6, 7, or 8.

Consequently, when a normal CP is configured and the special subframe configuration is set as 1, 2, 3, 4, 6, 7, or 8, one or more CSI-RS resources can be configured to some or all of thirty two REs indicated by A0, A1, B0, B1, H1 in FIG. 16. The CSI-RS resources can be aggregated into one Channel Measurement Resource (CMR). When a CSI-RS resource is composed of two CSI-RS ports, the CSI-RS resource may be designated by two REs corresponding to one of A0, A1, B0, B1, H1 shown in FIG. 16. As another example, when a CSI-RS resource is composed of four CSI-RS ports, the CSI-RS resource may be designated by four REs corresponding to a pair of the same alphabet [X0-X1] of A0, A1, B0, B1, H1 shown in FIG. 16. As another example, when a CSI-RS resource is composed of eight CSI-RS ports, the CSI-RS resource may be designated by eight REs corresponding to one group of [A0, A1, B0, B1], [C0, C1, D0, D1], [E0, E1, F0, F1], and [G0, G1, H0, H1] shown in FIG. 16. If the special subframe configuration

TABLE 6

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — | is set as one of 1, 2, 6, and 7, a terminal does not expect that a CSI-RS is configured to REs corresponding to one or more of {A0, A1, B0, B1, E0, E1, F0, F1} shown in FIG. 16. When a normal CP is configured and the special subframe configuration is set as one of 1, 2, 6, and 7, the DwPTS is not transmitted in the slot 1, so a CSI-RS cannot be transmitted to G0, G1, H0, and H1 shown in FIG. 16. If the special subframe configuration is set as 0, 5 or 9 in a normal CP environment, a CSI-RS is not transmitted to the DwPTS.

A CSI-RS configuration mapping table for a normal CP based on the embodiment described above is the following Table 7. Table 7 is a table showing CSI reference signal configurations mapped to (k', l') of a normal CP and of a DwPTS.

TABLE 7

| | | \multicolumn{6}{c}{Number of CSI reference signals configured} | | | | | |
|---|---|---|---|---|---|---|---|
| | CSI reference signal configuration | 1 or 2 | | 4 | | 8 | |
| | | (k', l') | $n_s$ mod 2 | (k', l') | $n_s$ mod 2 | (k', l') | $n_s$ mod 2 |
| Special subframe, configuration 1, 2, 3, 4, 6, 7, or 8 | 0 | (9, 5) | 0 | (9, 5) | 0 | (9, 5) | 0 |
| | 1 | (8, 5) | 0 | (8, 5) | 0 | | |
| | 2 | (3, 5) | 0 | | | | |
| | 3 | (2, 5) | 0 | | | | |
| Special subframe, configuration 3, 4, or 8 | 4 | (11, 5) | 0 | (11, 5) | 0 | (11, 5) | 0 |
| | 5 | (7, 5) | 0 | (7, 5) | 0 | (7, 5) | 0 |
| | 6 | (9, 2) | 1 | (9, 2) | 1 | (9, 2) | 1 |
| | 7 | (10, 5) | 0 | (10, 5) | 0 | | |
| | 8 | (6, 5) | 0 | (6, 5) | 0 | | |
| | 9 | (8, 5) | 1 | (8, 5) | 1 | | |
| | 10 | (5, 5) | 0 | | | | |
| | 11 | (4, 5) | 0 | | | | |
| | 12 | (1, 5) | 0 | | | | |
| | 13 | (0, 5) | 0 | | | | |
| | 14 | (3, 2) | 1 | | | | |
| | 15 | (2, 2) | 1 | | | | |

[Method of Configuring CSI-RS and CMR at a DwPTS when Extended CP is Used]

Figure 17:
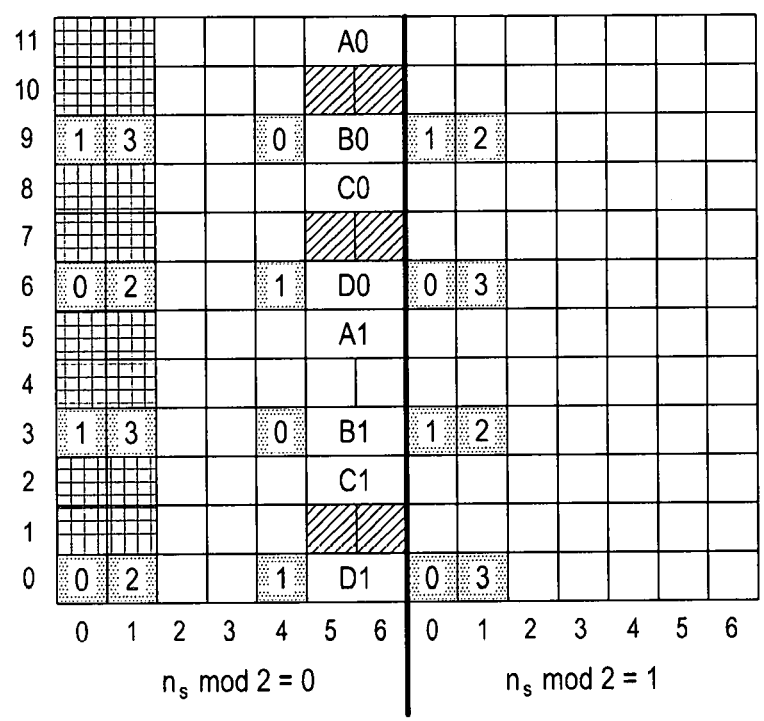
FIG. 17 is a diagram showing a DMRS RE when an extended CP according to an embodiment is configured and a special subframe configuration is set as 1, 2, 3, 5, or 6.
Figure 18:
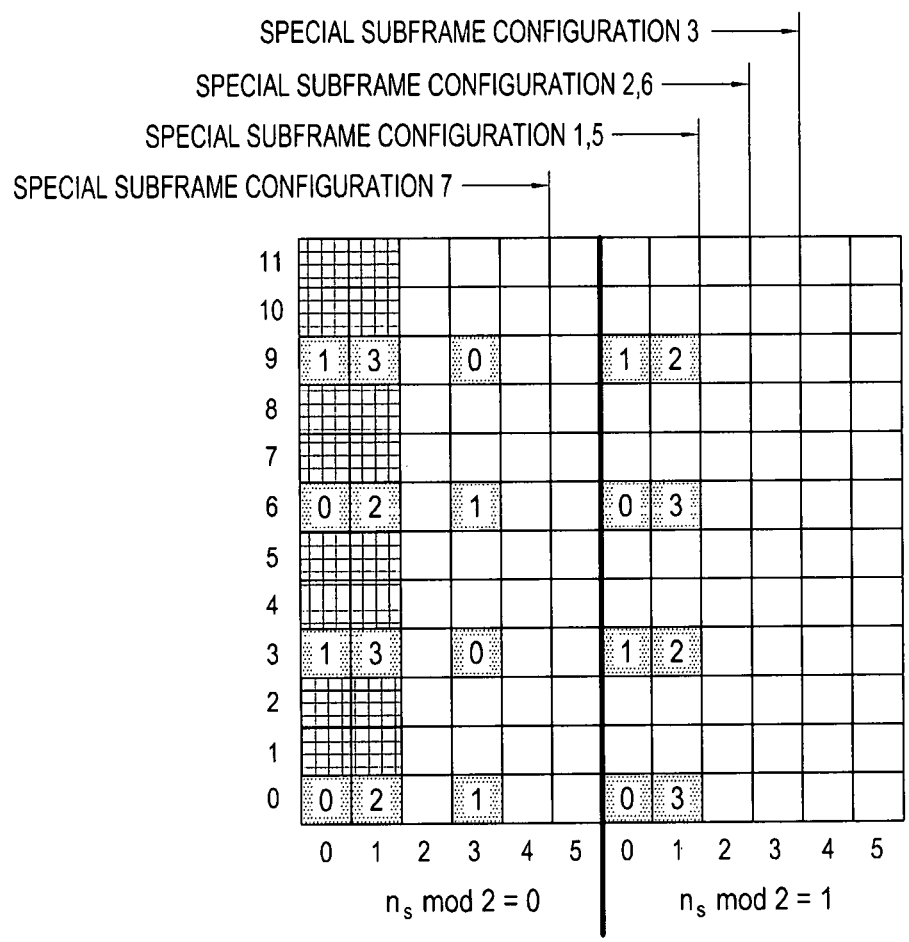
FIG. 18 is a diagram in which an extended CP according to an embodiment is configure and the number of OFDM symbols that are used as DwPTSs in accordance with a special subframe configuration is shown.

Even through an extended CP is used, it is possible to configure resources for CSI-RS transmission at the DwPTS in the similar way to the case of using a normal CP. When an extended CP is configured, the positions of DMRS at the DwPTS are eight REs indicated by hatching lines in FIG. 17, and the number of OFDM symbols that are used as DwPTSs in accordance with special subframe configurations are as shown in FIG. 18. Accordingly, according to similar principle to the embodiment related to a normal CP described above, when an extended CP is configured and a special subframe configuration is set as 1, 2, 3, 5, or 6, a plurality of CSI-RS resources can be configured to some or all of sixteen REs indicated by A0, A1, B0, B1, C0, C1, D0, and D1 shown in FIG. 17. The CSI-RS resources can be aggregated into one CMR. When a CSI-RS resource is composed of two CSI-RS ports, the CSI-RS resource may be designated by two REs corresponding to one of A0, A1, B0, B1, D1 shown in FIG. 17. As another example, when a CSI-RS resource is composed of four CSI-RS ports, the CSI-RS resource may be designated by four REs corresponding to one group of A0, A1], [B0, B1], [C0, C1], and [D0, D1] shown in FIG. 17. As another example, when a CSI-RS resource is composed of eight CSI-RS ports, the CSI-RS resource may be designated by eight REs corresponding to one group of [A0, A1, B0, B1] and [C0, C1, D0, D1] shown in FIG. 17. If the special subframe configuration is set as 0, 4 or 7 in an extended CP environment, a CSI-RS is not transmitted to the DwPTS.

TABLE 8

| | | \multicolumn{6}{c}{Number of CSI reference signals configured} | | | | | |
|---|---|---|---|---|---|---|---|
| | CSI reference signal configuration | 1 or 2 | | 4 | | 8 | |
| | | (k', l') | $n_s$ mod 2 | (k', l') | $n_s$ mod 2 | (k', l') | $n_s$ mod 2 |
| Special subframe, configuration 1, 2, 3, 5 or 6 | 0 | (11, 4) | 0 | (11, 4) | 0 | (11, 4) | 0 |
| | 1 | (9, 4) | 0 | (9, 4) | 0 | (9, 4) | 0 |
| | 2 | (5, 4) | 0 | (5, 4) | 0 | | |
| | 3 | (3, 4) | 0 | (3, 4) | 0 | | |

TABLE 8-continued

| | Number of CSI reference signals configured | | | | | |
|---|---|---|---|---|---|---|
| CSI reference | 1 or 2 | | 4 | | 8 | |
| signal configuration | (k', l') | $n_s$ mod 2 | (k', l') | $n_s$ mod 2 | (k', l') | $n_s$ mod 2 |
| 4 | (8, 4) | 0 | | | | |
| 5 | (6, 4) | 0 | | | | |
| 6 | (2, 4) | 0 | | | | |
| 7 | (0, 4) | 0 | | | | |

In common mobile communication systems, not only the periodic feedback of a terminal, but aperiodic feedback is supported. When a base station wants to obtain the non-periodic feedback information of a specific terminal, the base station performs uplink data scheduling for the terminal by configuring a non-period feedback indicator included in Downlink Control Information (DCI) for uplink data scheduling of the terminal to perform specific non-periodic feedback.

When the terminal receives an indicator configuration to perform aperiodic feedback in the n-th subframe, the terminal performs uplink transmission by including aperiodic feedback information in data transmission in the n+k-th subframe. k, which is a parameter determined in advance, is 4 in FDD and may be defined as in the following Table 9 in TDD.

TABLE 9

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

When the aperiodic feedback is configured, the feedback information includes an RI, a PMI, and a CQI, similar to the periodic feedback, in which the RI and the PMI may not be fed back, depending on the feedback configuration. The CQI may include both of a wCQI and an sCQI or may include only a wCQI.

Reporting types of periodic channel state reporting that uses a PUCCH and the payload size of information reported and used for each of the reporting types may be determined in advance.

A terminal transmits RI/PTI/PMI/CQI information, using a necessary reporting type in accordance with a PUCCH reporting mode and a reporting instance of periodic channel state reporting. However, the terminal can transmit only one type of PUCCH reporting at one point of reporting time (subframe) because the periodic channel state reporting uses a PUCCH in which designated resources and the payload sizes that can be sent are limited.

Accordingly, when points of reporting times between CSI processes in one cell conflict with each other or when points of reporting times between different cells conflict with each other in a carrier aggregation (CA) situation, priority is determined in accordance with the PUCCH reporting types, thereby removing conflict. The reference for determining the priority may be a reporting period. The longer the reporting period, the more important and higher in priority the information, and the shorter the reporting period, the lower the priority. In general, priority is given in the order of RI>wideband PMI>wideband CQI>subband PMI and CQI, depending on reporting types, and when reports having the same priority between different cells conflict with each other, the conflict is removed by transmitting the information of a cell having a low cell index. Further, when information is not reported due to conflict, the remaining periodic channel state reporting continues using the most recently reported information for the corresponding information. For example, when wideband PMI information fails to be reported and the most recently reported wideband PMI is 0, it is assumed the wideband PMI at the current point of reporting time is also 0 and the remaining second PMI and CQI information is reported.

There are two method of supporting a plurality of antennas in an FD-MIMO system. They are a method using a Non-Precoded (NP) CSI-RS and a method using a BF CSI-RS. The method of using an NP CSI-RS is a method in which a base station transmits a CSI-RS having a large beam width to a terminal and the terminal transmits RI/PMI/CQI corresponding to the beam to the base station, similar to the method of transmitting a CSI-RS. In common mobile communication systems, up to eight CSI-RS ports are supported, but a method of supporting various, for example, twelve/sixteen/thirty two/sixty four NP CSI-RS ports and a 2D codebook for PMI reporting may be considered in the FD-MIMO system.

However, the method of using a BF CSI-RS is a method of dividing the entire beam region into 1D or 2D to optimize the number of codebooks that is calculated by a terminal at a time and CSI-RS overhead. The method may be classified into a method using a cell specific BF CSI-RS and a method using a UE specific BF CSI-RS in accordance with methods of selecting 1D or 2D sector for a terminal. The method using a cell specific BF CSI-RS is a method of transmitting a plurality of same beams to a terminal in terms of a cell, and select a beam and transmits data on the basis of channel state reporting that is reported by the terminal on the basis of the beam. A CSI-RS resource index (CRI) or Beam Index (BI) may be included in the channel state report. Accordingly, when there are several CSI-RS resources or CSI-RS ports in one CSI process, the terminal can select and transmit information about a preferred beam. According to methods of the related art, a plurality of CSI processes is configure and a base station selects preferred information from all of channel state information, but a terminal selects information, so it is possible to save uplink resources and reduce complexity when operating a base station.

The BI or CRI may also generate conflict similar to the RI/PMI/CQI that are used for periodic channel state reporting in the related art. Accordingly, it is required to configure priority in consideration of this conflict and configure a promise for operation when conflict is generated. Further, as described above, the same information that has been most recently reported was assumed in the related art, but resources having different beams or TPs may be designated due to the CRI, so the statistical characteristics of the channel to be measured may be changed. Accordingly, it is dangerous to use the same information that has been most recently reported in periodic channel state reporting in the same way as the related art.

As described above, it is possible to reduce CSI-RS overhead, using the BF CSI-RS in the FD-MIMO system, as compared with the non-precoded CSI-RS used in the related art. However, when the number of cell specific beams that are supported by the cell specific BF CSI-RS is increased, the BI or CRS may be used to effectively use the reporting resources. The BI and CRI are obtained by selecting and reporting a small number of resources that the terminal prefers of a plurality of CSI-RS resources to the base station and reporting only channel state information based on the selected resources. Since the periodic channel state reporting using a PUCCH can transmit only limited information at a time, when a plurality of items of information has to be transmitted, only information having higher priority is transmitted in accordance with the priority. In an embodiment, when the BI or CRI are applied with existing RI, PMI, and CQI, they are transmitted together with the existing channel state information, or when it is not reported in accordance with the priority, the channel state information is effectively transmitted to the base station.

According to an embodiment, a method of receiving feedback information of a base station in a mobile communication system includes: a step of transmitting configuration information about at leas one or more reference signals to a terminal; a step of measuring the reference signals and then transmitting feedback configuration information for generating feedback information according to the measurement result to the terminal; a step of transmitting the reference signals to the terminal; and a step of receiving feedback information transmitted from the terminal at a feedback timing according to the feedback configuration information.

According to an embodiment, a base station that receives feedback information from a terminal in a mobile communication system includes: a communication unit that transmits and receives signal to and from a terminal; and a control unit that controls the base station to transmit configuration information about at least one or more reference signals to the terminal, measure the reference signals, transmit feedback configuration information for generating feedback information according to the measurement result to the terminal, transmit the reference signals to the terminal, and receive feedback information transmitted from the terminal at a feedback timing according to the feedback configuration information.

According to an embodiment, a method of transmitting feedback information of a terminal in a mobile communication system includes: a step of receiving configuration information about at least one or more reference signals from a base station; a step of measuring the reference signals and receiving feedback configuration information for generating feedback information according to the measurement result from the base station; a step of receiving the reference signals from the base station; a step of measuring the received reference signals and generating feedback information according to the feedback configuration information; and a step of transmitting the created feedback information to the base station at a feedback timing according to the feedback configuration information.

According to an embodiment, a terminal that transmits feedback information to a base station in a mobile communication system includes: a communication unit that transmits and receives signals to and from the base station; and a control unit that controls the terminal to receive configuration information about at least one or more reference signals from the base station, measure the reference signals, receive feedback configuration information for generating feedback information according to the measurement result from the base station, receive the reference signals from the base station, measure the received reference signals, create feedback information according to the feedback configuration information, and transmit the created feedback information to the base station at a feedback timing according to the feedback configuration information.

In general, when there are many transmission and reception antennas like an FD-MIMO system, CSI-RSs proportioned to the number of the antennas should be transmitted. For example, when eight transmission and reception antennas are used, a base station transmits CSI-RSs corresponding to 8-ports to a terminal such that the terminal measures the channel state of a downlink. The base station has to use radio resources composed of eight REs, as shown by A and B in FIG. 1, in one RB to transmit CSI-RSs corresponding to 8-ports. When this CSI-RS transmission is applied to an FD-MIMO system, radio resources corresponding to the number of transmission and reception antennas should be assigned to the CSI-RSs. That is, when a base station has 128 transmission and reception antennas, the base station has to transmit CSI-RSs, using a total of 128 REs in one RB. According to this CSI-RS transmission, it is possible to increase the accuracy in channel measurement between antennas, but excessive radio resources are required, so the radio resources for radio data transmission and reception are reduced. Accordingly, in consideration of the advantage and disadvantage, the following two methods may be considered to transmit CSI-RSs for a base station having many transmission and reception antennas in an FD-MIMO system.

1. CSI-RS transmission method 1: A method of assigning radio resources corresponding to the number of antennas to CSI-RSs and transmitting the CSI-RSs.

2. CSI-RS transmission method 2: A method of dividing CSI-RSs into a plurality of dimensions and transmitting the CSI-RSs.

Figure 19:
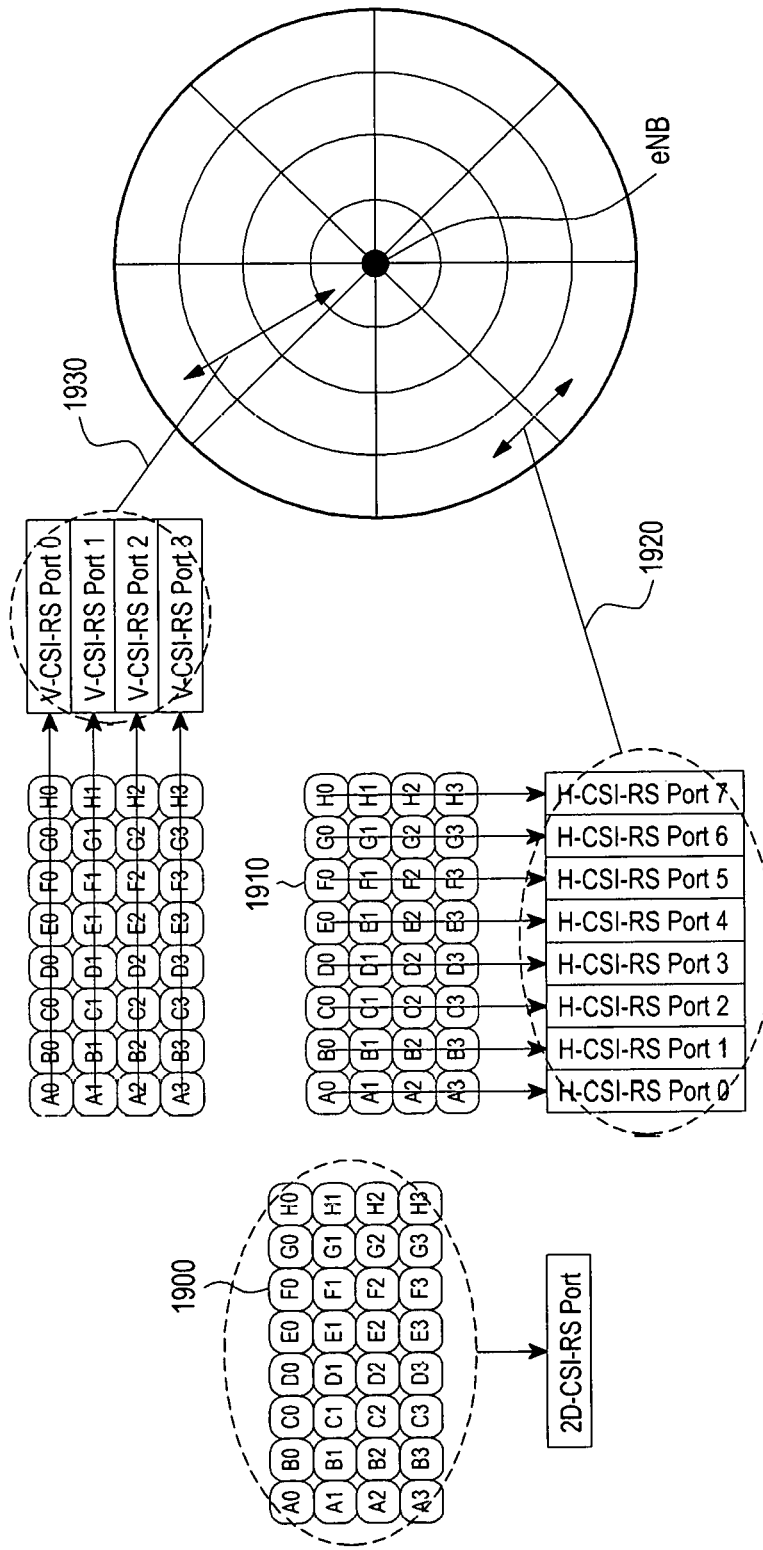
FIG. 19 is a diagram showing CSI-RS transmission methods 1 and 2 according to an embodiment.

FIG. 19 is a diagram showing CSI-RS transmission methods 1 and 2 according to an embodiment.

Referring to FIG. 19, a base station that operates an FD-MIMO system includes a total of 32 antennas. In FIG.

19, the CSI-RS transmission method 1 300 is a method of transmitting CSI-RSs after assigning radio resources corresponding to the number of antennas. In the CSI-RS transmission method 1 300, the 32 antennas are indicated by A0, . . . , A3, B0, . . . , B3, C0, . . . , C3, D0, . . . , D3, E0, . . . , E3, F0, . . . , F3, G0, . . . , G3, H0, . . . , H3. The 32 antennas are transmitted to one 2D CSI-RS and the 2D CSI-RS for measuring channel states of the antennas in vertical and horizontal directions is composed of 32 antenna ports indicated as described above. According to this method, radio resources are all assigned to antennas, so the accuracy of channel information can be increased, but relatively much control information or radio resources for data are used, so it is not effective in terms of efficiency of resources.

In FIG. 19, the CSI-RS transmission method 2310 is a method of allowing a relatively small number of radio resources even though the accuracy of channel information is low such that a terminal can perform channel measurement on many transmission antennas. This is a method of transmission all CSI-RSs separately in N dimensions, and for example, when the transmission antennas of a base station are arranged in two dimensions, the method transmits CSI-RSs separately in 2 dimensions. One CSI-RS is operated as a horizontal CSI-RS (hereafter, referred to as 'H-CSI-RS') for measuring horizontal channel information and the other CSI-RS is operated as a vertical CSI-RS (hereafter, referred to as 'V-CSI-RS') for measuring vertical channel information. In the CSI-RS transmission method 2 310, the 32 antennas are, similar to the CSI-RS transmission method 1 300, indicated by A0, . . . , A3, B0, . . . , B3, C0, . . . , C3, D0, . . . , D3, E0, . . . , E3, F0, . . . , F3, G0, . . . , G3, H0, . . . , H3. The 32 antennas transmit two CSI-RSs. The H-CSI-RS for measuring the horizontal channel state is composed of the following eight antenna ports.

1. H-CSI-RS port 0: formed by combining antennas A0, A1, A2, A3
2. H-CSI-RS port 1: formed by combining antennas B0, B1, B2, B3
3. H-CSI-RS port 2: formed by combining antennas C0, C1, C2, C3
4. H-CSI-RS port 3: formed by combining antennas D0, D1, D2, D3
5. H-CSI-RS port 4: formed by combining antennas E0, E1, E2, E3
6. H-CSI-RS port 5: formed by combining antennas F0, F1, F2, F3
7. H-CSI-RS port 6: formed by combining antennas G0, G1, G2, G3
8. H-CSI-RS port 7: formed by combining antennas H0, H1, H2, H3

Forming one CSI-RS port by combining a plurality of antennas means antenna virtualization, in which, generally, a plurality of antennas is linearly combined. The V-CSI-RS for measuring the vertical channel state is composed of the following four antenna ports.

1. V-CSI-RS port 0: formed by combining antennas A0, B0, C0, D0, E0, F0, G0, H0
2. V-CSI-RS port 1: formed by combining antennas A1, B1, C1, D1, E1, F1, G1, H1
3. V-CSI-RS port 2: formed by combining antennas A2, B2, C2, D2, E2, F2, G2, H2
4. V-CSI-RS port 3: formed by combining antennas A3, B3, C3, D3, E3, F3, G3, H3

When a plurality of antennas is arranged in two dimensions, M×N (vertical direction×horizontal direction), it is possible to measure the channel of an FD-MIMO system, using N horizontal CSI-RS ports and M vertical CSI-RS ports. That is, when two CSI-RSs are used, it is possible to find out channel state information, using M+N CSI-RS ports for M×N transmission antennas. As described above, it is an important advantage in reducing CSI-RS overhead to find out information about more transmission antennas using less CSI-RS ports. The method of finding out channel information about transmission antennas of a FD-MIMO using M×N=K CSI-RSs can be applied in the same way to the case using two CSI-RSs.

On the other hand, the CSI-RS transmission method 1 was assumed in the description of an embodiment, but it should be noted that the present disclosure can be expanded and applied in the same way even if the CSI-RS transmission method 2 is used.

The following abbreviations are used to describe an embodiment.

1. RI: A rank indicator obtained by notifying a base station of a rank of a channel obtained by applying precoding to a BF CSI-RS by a terminal or determined by a predetermined rule.
2. W1: The first precoding matrix indicator of which a terminal notified a base station by obtaining optimal precoding on the basis of a channel obtained by applying precoding to a BF CSI-RS. The first precoding matrix indicator may show a beam group selected horizontally and vertically. Further, W1 may be divided into horizontal and vertical components.
3. W2: The second precoding matrix indicator of which a terminal notified a base station by obtaining optimal precoding on the basis of a channel obtained by applying precoding to a BF CSI-RS. The second precoding matrix indicator may show co-phasing for correcting a phase difference of antennas having polarization different from that of a beam selected from a beam group selected horizontally and vertically. Similar to W1, W2 may also be divided into horizontal and vertical components.
4. CQI: A terminal-supportable data rate created under the assumption that precoding has been applied.

In order for a terminal to be able to report feedback information, the terminal receives feedback information configuration for 2D-CSI-RS. The 2D-CSI-RS may be on signal for designation a plurality of CSI-RS ports or may be signals designating a plurality of CSI-RS ports by combining a plurality of, 2, 4, or 8 port CSI-RSs (resource configuration, subframe configuration). Thereafter, one feedback is assigned to the terminal through RRC information and one CSI-RS resource may be as in the following Table 12 or may include only some of the components shown in Table 10 in order to assign the feedback.

| CIS process configuration information | |
|---|---|
| NZP CIS-RS ID List | Configuration IDs of CSI-RS resources for transmitting CRIs |
| CIS-IM-ID List | Configuration IDs of CSI-IM resources for transmitting CRIs |
| CSR List | Configuration CSR for CSI-RSs |
| Channel Measurement Restriction | Setting measurement restriction to be applied to CSI-RS |
| Interference Measurement Restriction | Setting measurement restriction to be applied to CSI-IM |
| Report Both | Including configuration about RI reference CSI process and configuration about PMI-RI reporting |
| Report Periodic Proc Id | Including ID information for periodic channel state reporting |
| Report Aperiodic Proc | Including information about aperiodic channel state reporting |
| Etc . . . | Other information |

In Table 10, NZP CSI-RS ID List is a field for configuration IDs of CSI-RS resources for transmitting CRIs. NZP CSI-RS ID List may be configured using the ID of CSI-RS configuration included in the following Table 11.

TABLE 11

| CSI-RS configuration information | |
|---|---|
| CSI-RS config ID | CSI-RS configuration ID |
| Antenna Ports Count | Number of CSI-RSs |
| Resource Config | CSI-RS resource information |
| Subframe Config | CSI-RS transmission period and offset information |
| Scrambling Identity | ID for scrambling CSI-RS |
| Qcl CRS info | Including information related to scrambling ID and CSR information for CoMP operation |
| Etc . . . | Other information |

In Table 11, CSI-RS Config ID means the ID of CSI-RS configuration. Antenna ports count means the number of configuring CSI-RS and Resource Config, which is CSI-RS information, means which REs a CSI-RS uses in one RB. Subframe Config means CSI-RS transmission period and offset information and Scrambling Identity means ID for scrambling CSI-RS. Qcl CRS info includes information related to scrambling ID and CSR information for CoMP operation. As described above, since the items of configuration information include information related to the number of antenna ports, they can be configured by combining CSI-RS resources having different numbers of antennas.

In Table 10, CSI-IM ID List is a field for configuration IDs of CSI-IM resources for transmitting CRIs. The IDs included in the field may be the same as the IDs included in NZP CSI-RS ID List. CSI-IM ID List may be configured using the ID of CSI-RS configuration included in the following Table 12.

TABLE 12

| CSI-IM configuration information | |
|---|---|
| CSI-IM Config ID | CSI-IM configuration ID |
| Resource Config | CSI-IM resource information |
| Subframe Config | CSI-IM transmission period and offset information |
| Etc . . . | Other information |

In Table 12, CSI-IM Config ID means the ID of CSI-IM configuration. Resource Config, which is CSI-IM information, means configuration about which REs the CSI-IM uses in one RB. Subframe Config means CSI-IM transmission period and offset information In Table 10, Channel measurement restriction and Interference measurement restriction are provided for showing whether measurement restriction to be applied to a CSI-RS and a CSI-IM, respectively, are configured. In Table 10, there is a corresponding field in CSI process configuration, but Channel measurement restriction and Interference measurement restriction may exist in periodic and aperiodic CSI reporting configuration, or it may exist as separate information other than the CSI process configuration information.

In table 10, Report Both includes configuration about RI reference CSI process and configuration about PMI-RI reporting. Report Aperiodic Proc includes information about aperiodic channel state reporting. Report Periodic Proc Id includes ID information to be used by a corresponding CSI process for periodic channel state reporting and may use the configurations included in Table 13.

TABLE 13

| Periodic channel state reporting configuration information | |
|---|---|
| CQI PUCCH resource index | PUCCH resource index information for CQI reporting |
| CQI PMI Config Index | CQI/PMI reporting period |
| CQI Format Indicator Periodic | CQI format indicator period |
| CRI Config Index | CRI reporting period |
| RI Config Index | RI reporting period |
| Simultaneous ACK/NACK And CQI | Information showing whether ACK/NACK and CQI are simultaneously transmitted |
| CQI-Mask | Information for restricting CQI/PMI/PTI/RI reporting at on-duration period of DRX cycle |
| CSI Config Index | CSI reporting period |

As in Table 13, in the configuration, information about resources of the PUCCH to be used for reporting, period about CQI/PMI reporting, and offset and submodes are configured. CRI ConfigIndex is required in addition to the periodic channel state reporting configuration in the related art. This is for configuration the point of time for reporting a CRI and a terminal can configure the CRI reporting period and offset, using ConfigIndex. In CSI-RS List in Table 10, it is possible to combine configurations that have different numbers of antenna ports and one or more CSI-RS resources are selected and reported, so there is a problem that cannot be solved only by the LTE periodic channel state reporting configuration in the related art.

[Method of Using Configuration Information when Several CSI-RS Resources Having Different Numbers of Antenna Ports are Used in Combination]

In an embodiment, there is proposed a method for solving problems that is generated when several CSI-RS resources having different numbers of antenna ports are configured in combination. Wideband channel state reporting is operated without a submode when a single structure codebook such as a 3GPP Rel-8 2Tx codebook and a 4Tx codebook is used, and submodes 1 and 2 can be configured as RRCs when a dual structure codebook such as a 3GPP Rel-10 8Tx codebook and a Rel-12 4Tx codebook is used. Accordingly, different kinds of sub sampling are performed and the periodic channel state reporting operation changes, depending on the codebook that are used. In the related art, since information is used for each CSI process, a submode is configured only when the CSI-RS configuration in a CSI process uses a dual structure codebook. However, when a channel state is reported using a Channel Reporting Indicator (CRI), some resources are used for a dual structure codebook and some resources are used for a single structure codebook. Accordingly, a submode is required when even only one CSI-RS of CSI-RS resources configuration in a CSI process uses a dual structure codebook.

Further, the format of channel state reporting that is supported may be changed, depending on resources. For a terminal positioned at a cell edge having a low SINR, when channel state reporting information is relatively inaccurate, it may be effective to receive channel state information reporting at the level of a wideband rather than a subband in order to reduce necessary resources. In contrast, for a terminal having a very high SINR, channels are sufficiently secured between the terminal and a base station, so there may be a small difference in system capability even if channel state information reporting is not received at a subband, as compared with wideband reporting. However, in most cases, subband reporting can improve the system capability even though the resource overhead for reporting is large, so both are needed. When wideband reporting and subband reporting are selectively performed, depending on resources, it is efficient, as described above, but there is also a defect that it may be complicated to achieve a terminal.

Considering this problem, there are two methods of supporting and configuration a CSI as follows.

1. Configuration method 1 for periodic channel state reporting: Periodic channel state reporting is supported for each CSI-RS resource.

2. Configuration method 2 for periodic channel state reporting: Periodic channel state reporting is supported in common for CSI-RS resources.

The Configuration method 1 is a method of supporting periodic channel state reporting configuration for each CSI-RS resource. In this case, periodic channel state configuration in Table 13 should correspond to the number of CSI-RS resources. Table 14 shows CSI process configurations in this case.

TABLE 14

CSI process configuration information

NZP CSI-RS ID List
CSI-IM-ID List
CSR List
Channel Measurement Restriction
Interference Measurement Restriction
Report Both
Report Periodic Proc Id
Report Aperiodic Proc
Etc . . .

In Table 14, when one periodic channel state reporting configuration ID can be used by giving notice of an ID for periodic channel state reporting configuration for each resource when Report Periodic Proc Id List is used. In this case, repeated configurations that use the same ID may be possible. However, the items of channel state information such as CRI/RI/PTI/CQI/PMI should be all transmitted at the same point of time. Accordingly, CRI Config Index, RI Config Index, and CQI Config Index configure the CSI-RS resources should have the same value. However, submodes can be configured respectively for the CSI-RS resources that support a dual codebook. Accordingly, there is the advantage that it is possible to use different submodes in accordance CSI-RS resources. For example, a beam that is transmitted for an area close to a cell center has a relatively high SINR and a short distance from a base station, so the RI and W1 bit are transmitted together, so the RI can be sufficiently received even if the RI coverage is small. In the submode 1, subsampling is relatively less, so more precoding can be supported, and accordingly, higher capability can be secured when the submode 1 is used. However, for a terminal positioned at a cell edge, when a rank and a wideband PMI are transmitted together, there may be a problem in securing the RI coverage. Accordingly, the problem with this resource can be solved by configuration the submode 2.

The wideband reporting and subband reporting configurations may be independently performed. Since the periodic channel state reporting is configuration as wideband reporting and subband reporting, the resources are selected on the basis of the CRI and channel state reporting is transmitted at the reporting period according to the periodic channel state reporting configurations assigned to the selected resources.

The Configuration method 2 is a method that supports one periodic channel state reporting configuration for all CSI-RS resources. As described above in the Configuration method 1, since the period and offset information for channel state reporting has only one value, one configuration can be shared in comparison to having a plurality of periodic channel state reporting configurations. However, since there is only one configuration, the degree of freedom in configuration channel state reporting using a CRI is reduced, unlike the configuration method 1.

It is possible to freely configure the submode 1/submode 2 in wideband/subband reporting and wideband reporting for each CSI-RS resource in the configuration method 1, but the submode should be limited to one in the configuration method 2. In the submode 1/submode 2, the submodes are used by applying corresponding configurations only when one or more CSI-RS resources of configured CSI-RS resources use a codebook based on a dual codebook structure, that is, only when eight CSI-RS ports are configured or four CSI-RS ports and an enhanced codebook are configured (alternativeCodeBookEnabledFor4TX-r12=TRUE). A method in which a terminal or a base station reports a periodic channel state on the basis of the submodes of resources, using the operation of configuration submodes, can be shown as the flowchart in FIG. 20.

Figure 20:
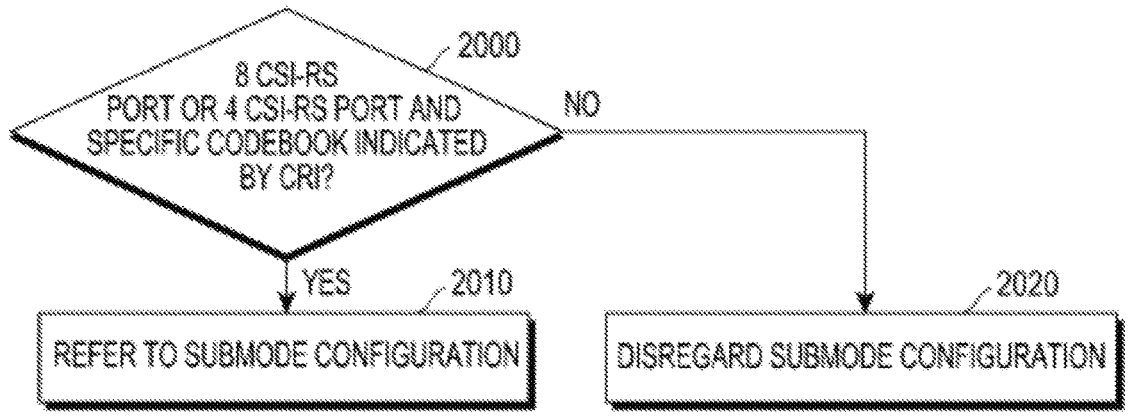
FIG. 20 is a flowchart showing a method of using a submode configuration when periodic channel state reporting is configured in common to CSI-RS resources according to an embodiment.

FIG. 20 is a flowchart showing a method of using a submode configuration when periodic channel state reporting is configured in common to CSI-RS resources according to an embodiment.

Referring to FIG. 20, in step 2000, a terminal or a base station determines whether a resource indicated by a CRI corresponds to 8 CSI-RS ports or 4 CSI-RS ports and a specific codebook (enhanced codebook). The terminal or base station refers to a submode configuration in step 2010, when the resource indicated by a CRI corresponds to the 8 CSI-RS ports or 4 CSI-RS ports and a specific codebook (enhanced codebook). The terminal or base station disregards the submode configuration in step 2010, when the resource indicated by a CRI does not correspond to the 8 CSI-RS ports or 4 CSI-RS ports and a specific codebook (enhanced codebook).

In the Configuration method 2, the method of allowing for freely performing wideband/subband reporting includes a method of allowing for configuration both of wideband reporting and subband reporting. It is possible to periodically or a periodically configure the wideband/subband reporting, using Periodic CSI reporting CSI-RS ID List or Aperiodic CSI reporting CSI-RS ID List included in the periodic channel state reporting configuration of Table 13 or the CSI process configuration of Table 14. Further, it may be possible to make the first CSI-RS resource and the second CSI-RS resources in bitmaps in accordance with not the ID, but the order configuration in NZP CSI-RS ID List such that wideband channel state reporting is performed when a corresponding resource configuration is 0, and subband channel state reporting is performed when it is 1. Since wideband configuration and subband configuration both exist in the periodic channel state reporting, a terminal checks which reporting the corresponding resource reported by the CRI has been configured for and should determine whether to use the wideband configuration or the subband configuration in accordance with the configuration, and a base station should estimate channel state reporting of the terminal on the basis of this information. A method of finding out whether the terminal or the base station used the wideband configuration or subband configuration for corresponding periodic channel state reporting, using the above method, is shown in FIG. 21.

Figure 21:
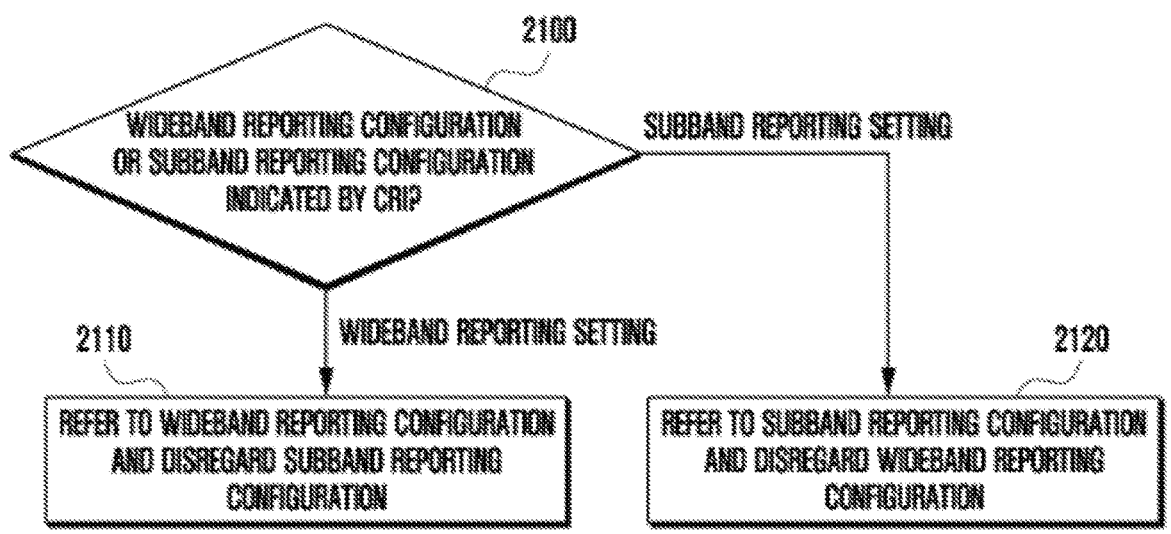
FIG. 21 is a flowchart showing a method of using wideband/subband configuration when periodic channel state reporting is configured in common to CSI-RS resources according to an embodiment.

FIG. 21 is a flowchart showing a method of using wideband/subband configuration when periodic channel state reporting is configured in common to CSI-RS resources according to an embodiment.

Referring to FIG. 21, in step 2100, a terminal or a base station determines whether wideband reporting or subband reporting has been configured for a resource indicated by a CRI. When the wideband reporting has been configured, the terminal or the base station refers to the wideband reporting configuration and disregards the subband reporting configuration in step 2110. When the subband reporting has been configured, the terminal or the base station refers to the subband reporting configuration and disregards the wideband reporting configuration in step 2120.

[Method of Setting Priority when a Plurality of Items of Channel State Information should be Transmitted at the Same Point of Time]

Figure 22:
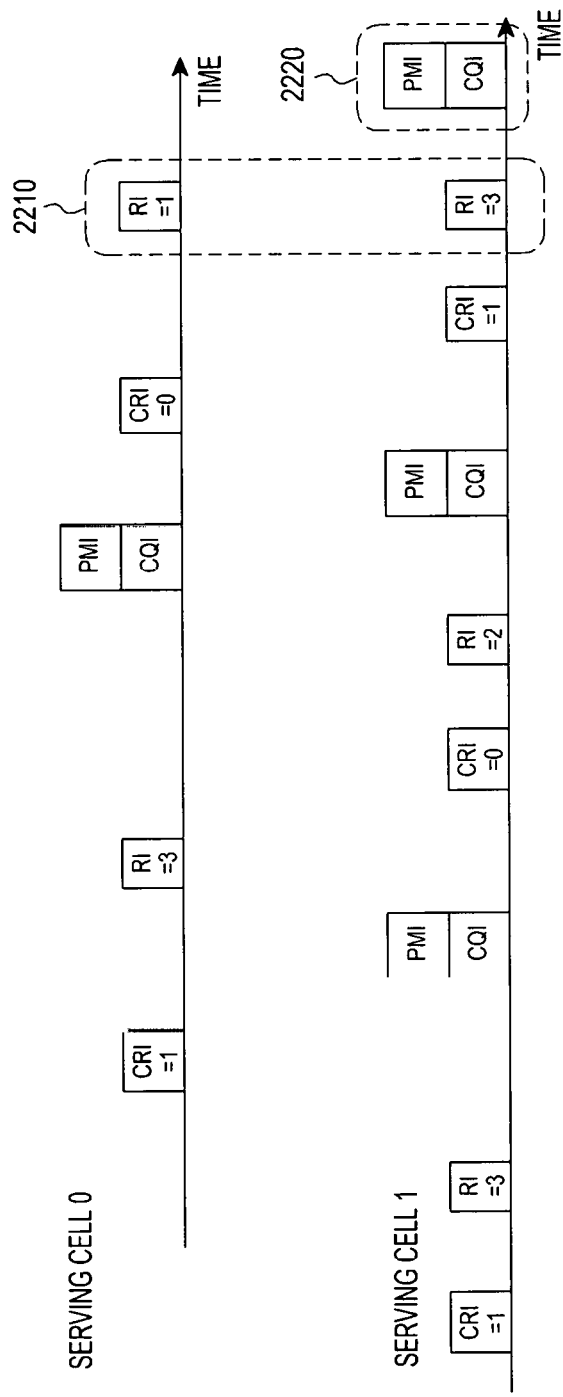
FIG. 22 is a diagram exemplarily showing a situation in which items of channel state reporting according to an embodiment conflict with each other.

In periodic channel state reporting, when a plurality of items of channel state information reporting conflicts in the same cell or between a plurality of cells (that is, when a plurality of items of channel state information reporting should be transmitted in the same subframe) in consideration of the characteristics of the PUCCH having limits in resources to be transmitted and the payload, priority is used to solve this problem. There is a solution that makes the most recently reported information be used for the RI/PTI and W1 when conflict occurs. However, another operation is required when the CRI is used. FIG. 22 shows an example of a situation in which items of channel state reporting conflict with each other.

FIG. 22 is a diagram exemplarily showing a situation in which items of channel state reporting according to an embodiment conflict with each other.

In periodic channel state reporting situation shown in FIG. 22, a terminal reports a wideband channel state, using two CSI processes. In 2210, RI reporting of a serving cell 0 and RI reporting of a serving cell 1 conflict with each other. The RI reporting of the serving cell 0 and the RI reporting of the serving cell 1 have the same priority both as RIs. Accordingly, when RIs conflict with each other, the RI of a serving cell having a lower cell index of a plurality of cells is reported. Accordingly, the RI reporting of the serving cell 0 is reported and the RI reporting of the serving cell 1 is not reported in FIG. 22.

As described above, the CRI is used for a terminal to select and transmit one or more CSI-RSs of CSI-RSs to which different beams were transmitted, to a base station. Accordingly, the same operation is possible when the terminal selects the same CSI-RS resource, using the CRI. However, when the terminal reports different CRIs, the statistical characteristics of a channel measured through corresponding CSI-RS and the statistically characteristics of a channel measured through a previously reported CSI-RS may be completely different, so performing an operation using a CRI may deteriorate the system capability. Accordingly, methods for solving this problem are as follows.

1. Method 1 for reporting when channel state information conflict occurs: The method 1 uses the most recent reporting information reported on the basis of the same CRI.

2. Method 2 for reporting when channel state information conflict occurs: The method 2 uses predetermined or preset fixed value.

The method 1 is a method of using the most recent reporting information reported on the basis of the same CRI. In the reporting indicated by 2110 in FIG. 22, a CRI has been changed to 1 from previous reported 0, so the channel that is reported has different statistical characteristics. Accordingly, not the information of the previously reported CRI 0, but the information when the most recently reported CRI is 1 is used. In this case, in FIG. 22, the RI value is not 2 that has been most recently reported, but 3 that has been most recently reported of RI values that have been reported on the basis of the same CRI (that is, CRI=1).

The method 1 is based on the most recent reporting, so it may be used as the most preferable method when a change in a CSI-RS resource is not large. However, for the characteristics of the PUCCH reporting, a long period is required, and when the reporting is combined with measurement restriction, the statistical characteristics of a channel may be changed even if reporting is performed using the same CRI, so channel state reporting may be inaccurate. Accordingly, the method 1 should be used in consideration of this matter. Although a case in which channel sate information is an RI was described in the above example, it should be noted that the same method can be used even if the channel state information is a PMI.

The method 2 is a method of using a predetermined value. The predetermined value may be a value previously defined in a standard, a value previously determined, or a value set busing an RRC field, and may be used as a fixed value. In the reporting indicated by 2210 in FIG. 22, a predetermined RI value may be used in consideration of the change of the CRI to 1 from the previously reported 0. The predetermined RI value, for example, may be 1 defined in a standard. Similar to the method 1, when PMI values conflict with each other, a predetermined PMI value may be used. For example, the predetermined PMI value may be 0 defined in a standard. According to the method 2, when channel characteristics are quickly changed, channel state information can be reported using predetermined accurate RI and PMI values, but when the channel characteristics are not largely changed, a predetermined value may be inaccurate RI or PMI value. Accordingly, method 2 should be used in consideration of this matter.

The methods 1 and 2 described above correspond to the operation when the previously reported CRI and the recently reported CRI are different. When the previously reported CRI and the recently reported CRI are the same, a channel state is reported on the basis of the most recent channel state reporting in the same way as the method used in related art.

Figure 23:
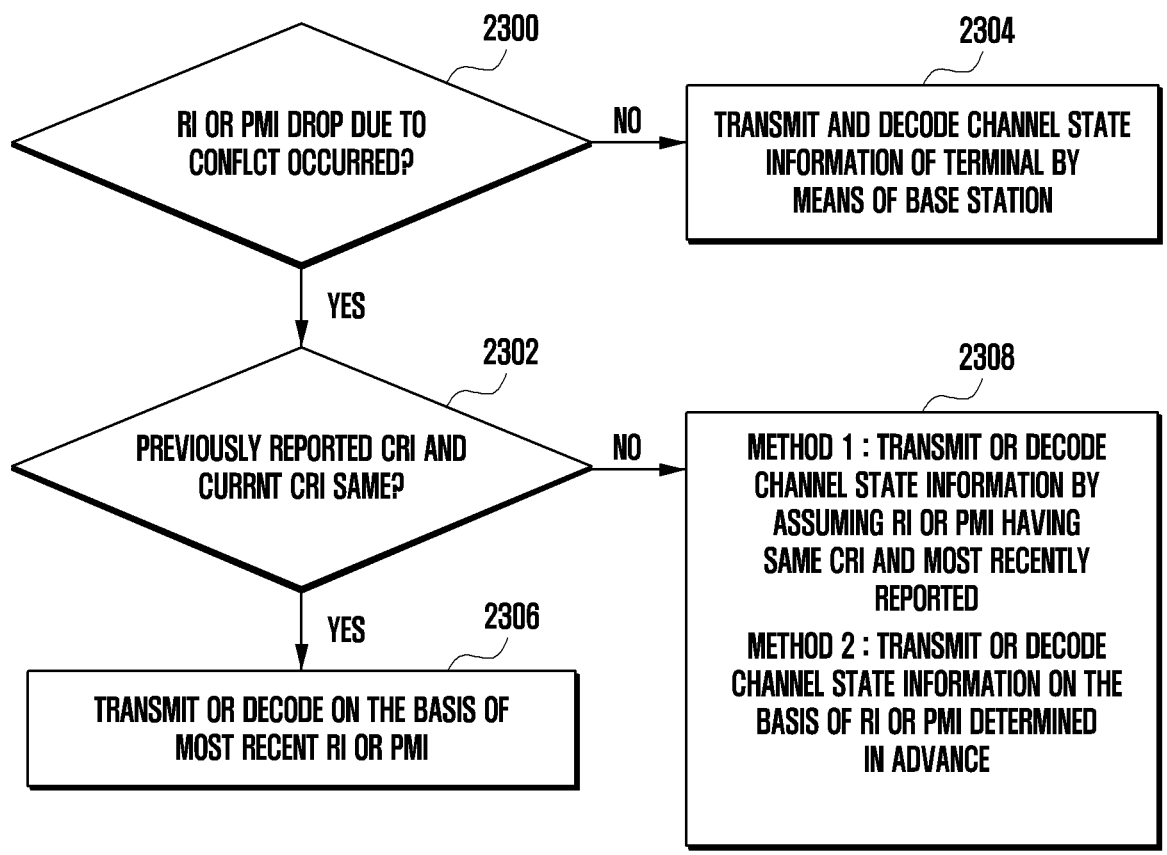
FIG. 23 is a flowchart showing a method of transmitting and decoding channel state information according to an embodiment.

A method in which a terminal or a base station reports or decodes channel state information when conflict occurs during transmission of periodic channel state information reporting is as shown in FIG. 23.

FIG. 23 is a flowchart showing a method of transmitting and decoding channel state information according to an embodiment.

Referring to FIG. 23, a terminal and a base station determines in step 2300 whether an RI or PMI drop occurs due to conflict in a plurality of serving cells. When an RI or PMI drop does not occur, in step 2304, the terminal transmits the RI or the PMI as channel state information and the base station receives and decodes the channel state information.

When an RI or PMI drop occurs, the terminal or the base station, in step 2302, determines whether the previously reported CRI is the same as the current CRI. When the previously reported CRI is the same as the current CRI, in step 2304, the terminal transmits the most recently reported RI or PMI as channel state information to the base station and the base station receives and decodes the channel state information.

When the previously reported CRI is not the same as the current CRI, in step 2308, one of the methods 1 or 2 described above may be used. That is, when the method 1 is used, the terminal transmits channel state information on the basis of the most recent RI or PMI having a CRI the same as the current CRI according to conflict and the base station receives and decodes the channel state information. When the method 2 is used, the terminal transmits channel state information on the basis of a predetermined RI or PMI and the base station receives and decodes the channel state information.

[Method of Setting Priority of Channel State Information of a Plurality of Serving Cells]

Figure 24:
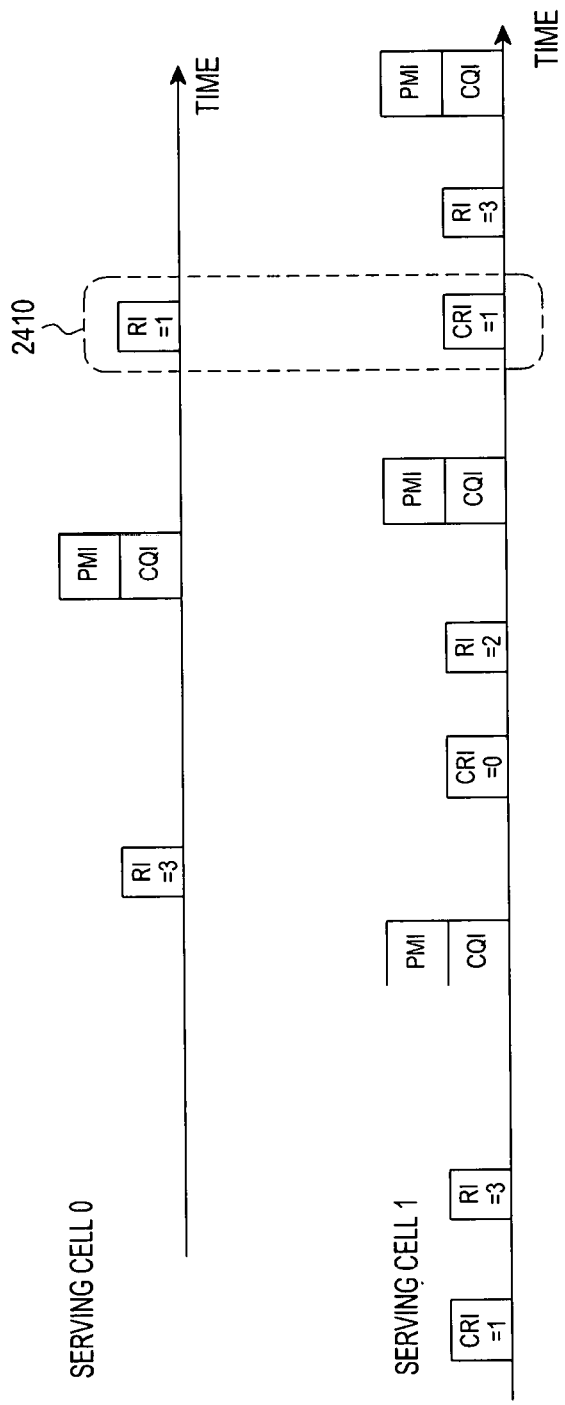
FIG. 24 is a diagram exemplarily showing a situation in which CRI reporting and RI reporting according to an embodiment conflict with each other.

In order to use an FD-MIMO method, all of a network device and antennas of a base station should support FD-MIMO and an Adaptive Antenna System (AAS). However, this configuration requires a high cost, so a method of the related art in a macro cell and use the FD-MIMO method in a small cell or a femto cell may be considered. This method can be sufficiently performed and may be an efficient method. In this case, CRI reporting is not performed in a primary cell (Pcell), but CRI reporting can be performed in a secondary cell (Scell). Further, conflict may be generated between CRI reporting and other channel state information and FIG. 24 shows an example of a situation in which CRI reporting and RI reporting conflict with each other. Although FIG. 24 shows an example of a situation in which CRI reporting and RI reporting conflict with each other, the following description can be used in the same way even if another channel state information causes conflict instead of the RI.

FIG. 24 is a diagram exemplarily showing a situation in which CRI reporting and RI reporting according to an embodiment conflict with each other.

Referring to FIG. 24, in 2410, RI reporting of a Pcell (serving cell 0) and CRI reporting of an Scell (serving cell 1) conflict with each other. However, unlike the CRI, the RI is information having higher priority in the Pcell. The Pcell provides a coverage and transmits and receive control information, so it plays an important part more than the Scell. Accordingly, in PUCCH reporting of the related art, when items of reporting having the same priority conflict with each other, the information of a cell having a lower serving cell index can be preferentially transmitted, whereby the information of the Pcell can be preferentially transmitted. The CRI is important information that shows which CSI-RS resource has been selected, but the RI information for transmission in the Pcell may be more important information. In this case, higher priority may be given to the RI of the Pcell through the following method.

Figure 25:
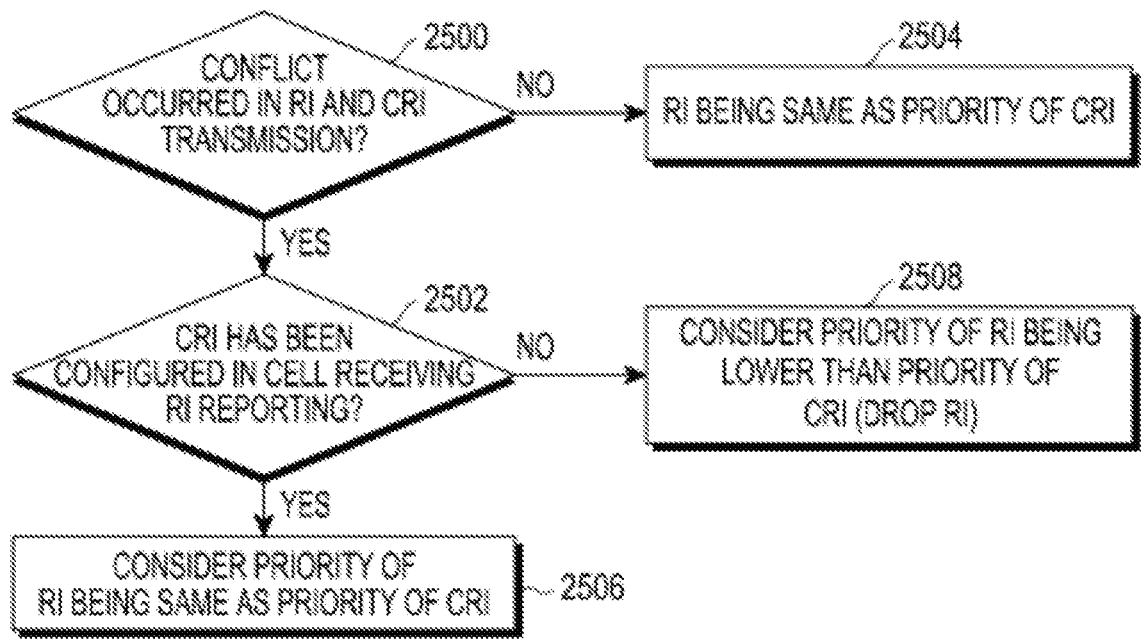
FIG. 25 is a flowchart showing a method of configuration priority when CRI reporting and RI reporting according to an embodiment conflict with each other.

A method of determining priority proposed in an embodiment is a method of making the priority of an RI the same as that of a CRI only in cells in which CRI reporting has not been configured. In this case, when the Pcell is not an FD-MIMO base station, it is possible to transmit the RI of a cell having a lower serving cell index prior to the CRI of a cell having a higher serving cell index. FIG. 25 shows operations of a terminal and a base station for this operation.

FIG. 25 is a flowchart showing a method of setting priority when CRI reporting and RI reporting according to an embodiment conflict with each other.

Referring to FIG. 25, a terminal or a base station, in step 2500, determines whether RI reporting of a Pcell and CRI reporting of an Scell have conflicted with each other. When the RI reporting of the Pcell and the CRI reporting of the Scell have not conflicted with each other, in step 2504, the terminal transmits the RI reporting of the Pcell and the CRI reporting of the Scell and the base station receives and decodes the RI reporting of the Pcell and the CRI reporting of the Scell.

When the RI reporting of the Pcell and the CRI reporting of the Scell have conflicted with each other, the terminal or the base station, in step 2502, determines whether a CRI has been configured in the cell that receives the RI reporting. When a CRI has been configured in the cell that receives thee RI reporting, the terminal or the base station enters step 2506 and considers the priority of the RI the same as that of the CRI. In this case, information corresponding to a lower serving cell may be reported to the base station. When a CRI has not been configured in the cell that receives thee RI reporting, the terminal or the base station enters step 2508 and considers the priority of the RI being lower than that of the CRI such that the RI drops.

[Method of Configuration Priority Between Items of Channel State Information Having Different Reporting Periods]

The CRI and RI are both information that is transmitted with a long period, so when the information is not reported, it takes relatively long time to wait for the next reporting period. Accordingly, the CRI and RI reporting has a relatively large influence on capability, as compared with when other channel state information is reported. Accordingly, when CRI and RI reporting periods conflict or overlap each other in the same cell, it is possible to improve capability, using the following methods.

1. Operation method 1 in conflict of CRI and RI: A CRI and an RI are joint-encoded and transmitted.

2. Operation method 2 in conflict of CRI and RI: When a feedback operation is a PUCCH 1-1 submode 1 or submode feedback that uses a PTI, RI is dropped, and if it is not, a CRI and an RI are joint-encoded.

3. Operation method 3 in conflict of CRI and RI: An RI is dropped when the payload of a combination of a CRI and an RI is a specific bit or more, and if it is not, the CRI and the RI are joint-encoded.

4. Operation method 4 in conflict of CRI and RI: An RI is dropped.

The operation method 1 is a method that always joint-encodes a CRI and an RI. In this case, transmission of a CRI and an RI can be always secured, so when decoding is possible, this method of the methods can provide the most effective capability. However, the payload of the combination of the CRI and the RI increases, so the transmission coverage decreases, and accordingly, when the channel state is not sufficiently good, the capability of the system may be deteriorate.

Figure 26:
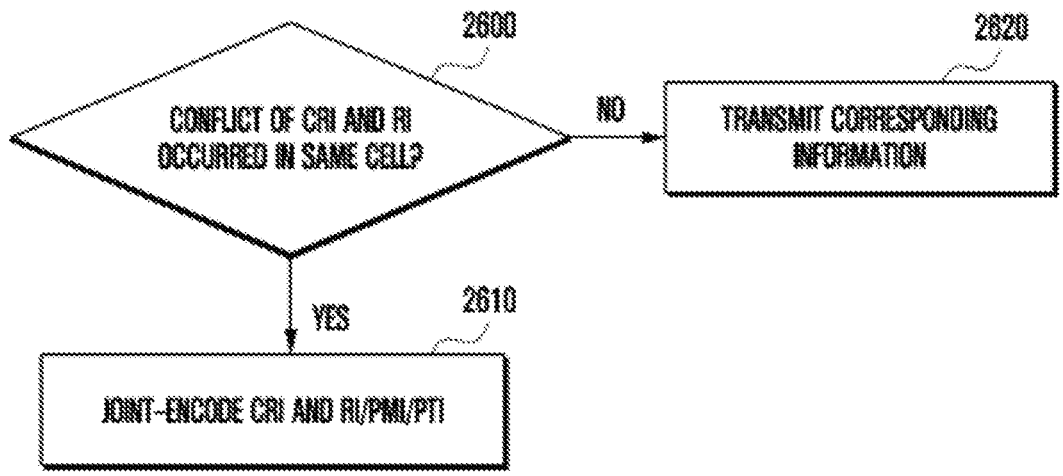
FIG. 26 is a flowchart showing an operation of a terminal in a situation when CRI and RI according to an embodiment conflict with each other.

FIG. 26 is a flowchart showing an operation of a terminal in a situation when a CRI and a RI according to an embodiment conflict with each other.

Referring to FIG. 26, the terminal, in step 2600, determines whether CRI and RI reporting periods conflict each other in the same cell. When the CRI and RI reporting periods do not conflict with each other in the same cell, in step 2620, the terminal transmits CRI reporting and RI reporting to a base station in accordance with the reporting periods. When the CRI and RI reporting periods conflict with each other in the same cell, in step 2610, the terminal joint-encodes the CRI reporting and the RI reporting and transmits it to the base station. Although a case in which the CRI reporting and the RI reporting conflict with each other was exemplified, a similar method may be applied when at least one of RI reporting/PMI reporting/PTI reporting conflicts with the CRI.

The operation method 2 includes a method of restricting joint-encoding in accordance with a feedback operation. As described above, in the submode 1 for wideband reporting, RI/W1 are subsampled into maximum 5 bits and transmitted at one point of time. Accordingly, when 3 bits for the CRI is added to the bits for the RI/W1, the payload size is rapidly increased, so the RI and CRI coverage is rapidly increased.

Similarly, for subband reporting that uses a PTI, maximum 4 bits are used for the RI/PTI. When 3 bits for the CRI is added to the bits for the PI/PTI, the number of bits increases to 7 bits. Accordingly, a method in which when feedback of which the payload size is sufficiently large has been configured at a corresponding point of time, RI/PMI/PTI are dropped, and if it is not, joint-encoding can be performed may be considered. This method as the advantage of being able to effectively combine coverage and joint-encoding. However, it should be considered that the method cannot use a joint-encoding operation for submode reporting that uses a PUCCH mode 1-1 submode 1 and a PTI.

Figure 27:
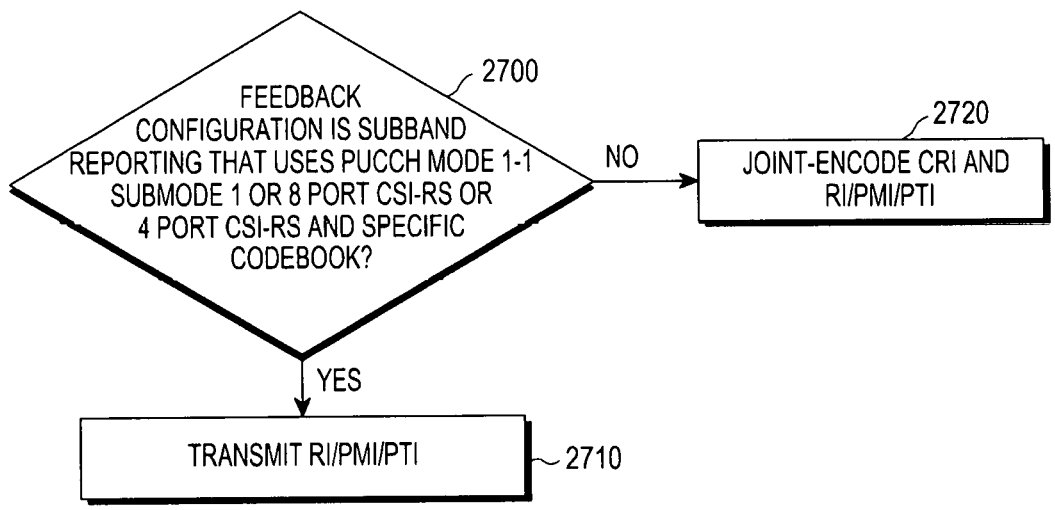
FIG. 27 is a flowchart showing another operation of a terminal in a situation when CRI and RI according to an embodiment conflict with each other.

FIG. 27 is a flowchart showing another operation of a terminal in a situation when a CRI and an RI according to an embodiment conflict with each other.

Referring to FIG. 27, the terminal, in step 2700, determines whether a feedback configuration is subband reporting that uses a PUCCH mode 1-1, a submode 1 or an eight-port CSI-RS or 4-port CSI-RS, and a specific codebook (enhanced codebook). When it is subband reporting, the terminal enters step 2710 and transmit the RI/PMI/PTI to the base station. When it is not subband reporting, the terminal, in step 2720, joint-encodes the CRI and the RI/PMI/PTI and transmits it to the base station.

Figure 28:
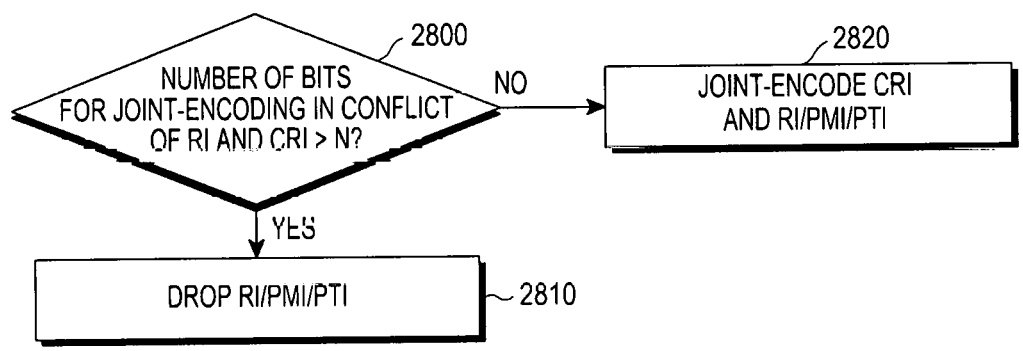
FIG. 28 is a flowchart showing another operation of a terminal in a situation when CRI and RI according to an embodiment conflict with each other.

The operation method 3 is a method of restricting joint-encoding, depending on a feedback payload size. As described in the operation method 2, the payload size is increased due to the RI/W1 or RI/PTI size when the PUCCH mode 1-1 submode 1 is used and the PUCCH mode 2-1 and the 8-port CSI-RS or 4-port CSI-RS and enhanced codebook are used. However, the number of bits of the RI is changed by the configuration number of CSI-RS ports and the number of supportable layers of UE capability. Further, the number of bits of the CRI can also be adjusted in accordance with the configuration number of resources. For example, when the number of resources is two or less, the number of bits of the CRI can be adjusted into 1 bit, when the number of resources is four or less, the number of bits of the CRI can be adjusted into 2 bits, and when the number of resources is eight or less, the number of bits of the CRI can be adjusted into 3 bits. Accordingly, when joint-encoding is restricted only in accordance with a feedback configuration, a corresponding operation may be restricted although the payload size for joint-encoding is smaller. Accordingly, it is possible to more efficiently support CRI/RI/PMI/PTI transmission through this determination. FIG. 28 is a flowchart showing another operation of a terminal in a situation when a CRI and an RI according to an embodiment conflict with each other.

Referring to FIG. 28, a terminal, in step 2800, determines whether the number of bits for joint-encoding is larger than N that is configured in advance when an RI and a CRI conflict with each other. When the number of bits for joint-encoding is larger than N, the terminal enters step 2810 and drops RI/PMI/PTI. When the number of bits for joint-encoding is not larger than N, the terminal enters step 2820 and joint-encodes the CRI and the RI/PMI/PTI.

Most of the methods proposed in various embodiments were described on the basis of periodic channel state reporting, but it should be noted that the methods can be used for aperiodic channel state reporting.

Figure 29:
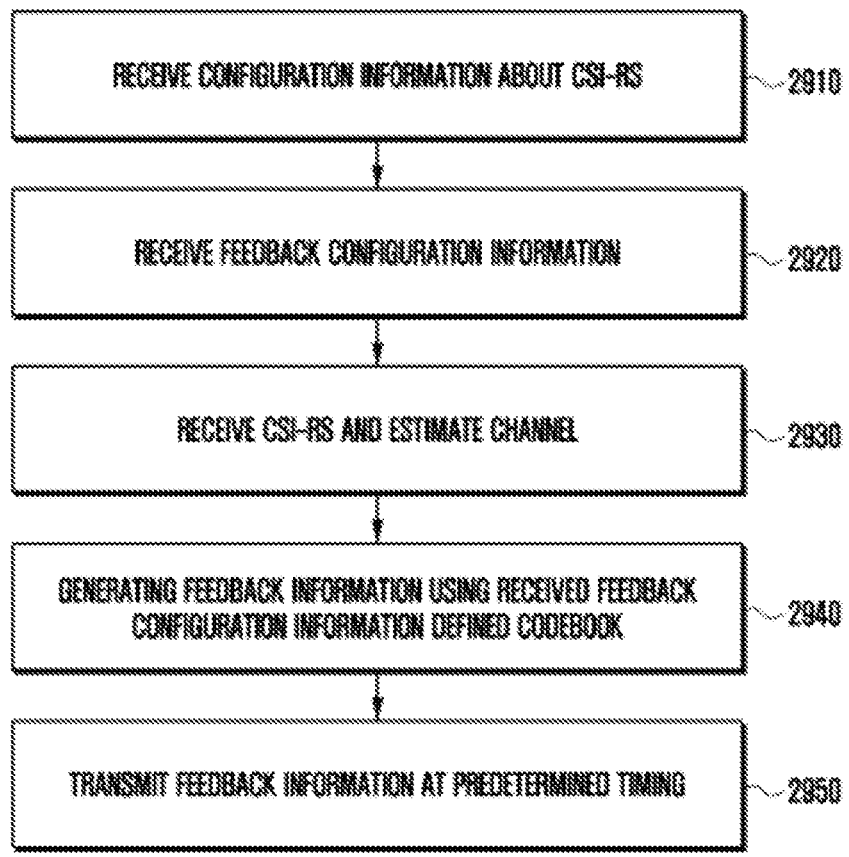
FIG. 29 is a flowchart showing an operation of a terminal according to an embodiment.

FIG. 29 is a flowchart showing an operation of a terminal according to an embodiment.

Referring to FIG. 29, the terminal, in step 2910, receives configuration information about a CSI-RS configuration from a base station. Information about which CSI-RS resources are used for corresponding CRI reporting may be included in the received configuration information. The terminal can check at least one of the numbers of ports for the CSI-RS resources, timings at which the CSI-RS resources are transmitted and resource positions, whether an RI-reference CSI-process has been configured and a corresponding CSI-RS resource index, CSI-IM resource position and timing, and transmission power information, on the basis of the received configuration information.

Thereafter, the terminal, in step 2920, configures feedback configuration (feedback configuration) information based on at least one CSI-RS. The feedback configuration information may be one item or may exist for each of CSI-RS resources. The feedback configuration information may be used to determine whether CSI-RS resources are applied in accordance with the number of CSI-RS ports or a codebook.

In step 2930, when the terminal receives a CSI-RS, the terminal estimates a channel between a transmission antenna of a base station and a reception antenna of the terminal. The terminal, in step 2940, creates a feedback information rank, a PMI, and a CQI, using the received feedback configuration information and the defined codebook, on the basis of a virtual channel added between the estimated channel and the CSI-RS. When conflict of feedback information reporting occurs due to feedback configuration made by the base station, the terminal can determine whether to drop or joint-encode corresponding information and which information it is based on to transmit next information, on the basis of the method according to an embodiment. Thereafter, in step 2950, the terminal transmits the determined items of information at a feedback timing determined in accordance with the feedback configuration of the base station to the base station, thereby ending the process of creasing and reporting channel feedback using the CRI.

Figure 30:
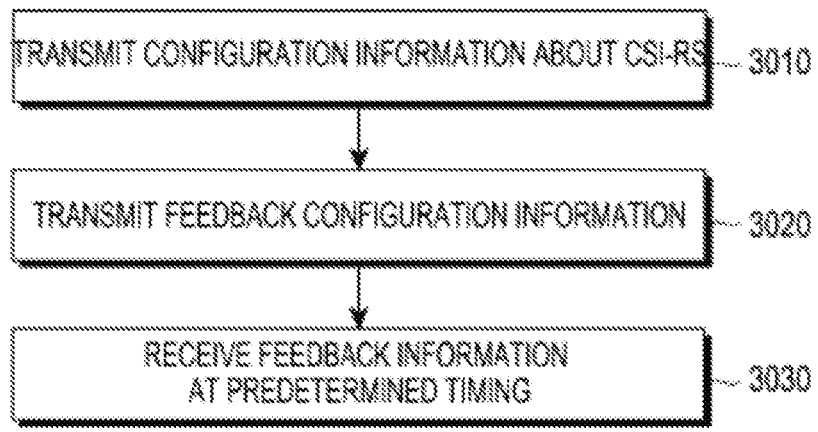
FIG. 30 is a flowchart showing an operation of a base station according to an embodiment.

FIG. 30 is a flowchart showing an operation of a base station according to an embodiment.

Referring to FIG. 30, the base station, in step 3010, transmits configuration information about one or more CSI-RS resources for measuring a channel to a terminal. The configuration information may include at least one of the numbers of ports for the CSI-RS resources, timings at which the CSI-RSs are transmitted and resource positions, whether an RI-reference CSI-process has been configure and a corresponding CSI-process index, CSI-IM resource position and timing, and transmission power information.

Next, the base station, in step 3020, transmits feedback configuration information based on at least one CSI-RS to the terminal. The feedback configuration information may be configured by differently determining whether configuration has been performed, in accordance with the number of CSI-RS ports and a codebook, in accordance with an embodiment. Thereafter, the base station transmits the configured CSI-RS resources to the terminal. The terminal estimates a channel for each antenna port and estimates an additional channel for a virtual resource on the basis of the estimate channels.

The terminal determines feedback and creates and transmits CRI, PTI, PMI, RI, and CQI corresponding to the feedback to the base station on the basis of the methods according to embodiments. Accordingly, the base station, in step 3030, receives feedback information from the terminal at a predetermined timing and uses the feedback information to determine the channel state between the terminal and the base station.

Figure 31:
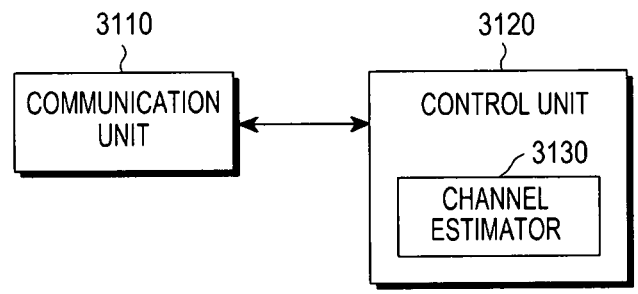
FIG. 31 is a block diagram showing the internal structure of a terminal according to an embodiment.

FIG. 31 is a block diagram showing the internal structure of a terminal according to an embodiment.

Referring to FIG. 31, the terminal includes a communication unit 3110 and a control unit 3120. The communication unit 110 transmits or receives data to or from another device (for example, a base station). The communication unit 3110 can transmit feedback information to the base station under the control of the control unit 3120.

The control unit 3120 can perform various operations of the terminal according to an embodiment by controlling the states and operations of all components included in the terminal. For example, the control unit 3120 creates feedback information in accordance with information assigned from the base station. The control unit 3120 controls the communication unit 3110 to feedback created channel information to the base station in accordance with timing information assigned from the base station. To this end, the control unit 3120 may include a channel estimator 3130. The channel estimator 3130 determines necessary feedback information on the basis of CSI-RS and feedback assignment information received from the base station and estimates a channel, using the received CSI-RS on the basis of the feedback information.

An example in which the terminal is composed of the communication unit 3110 and the control unit 3120 was described with reference to FIG. 31, but the present disclosure is not limited thereto and various components may be further provided, depending on the functions of the terminal. For example, the terminal may further include a display unit that displays the current state of the terminal, an input unit to which signals such as performing a function are input from a user, and a storage unit that stores created data in the terminal.

Further, the channel estimator 3130 is included in the control unit 3120 in the above example, but the present disclosure is not limited thereto. That is, the channel estimator 3130 may be included not in the control unit 3120, but in the terminal as a physically independent component. The control unit 3120 can control the communication unit 3110 to receive configuration information for at least one reference signal resource from the base station. The control unit 3120 can control the communication unit 3110 to measure the reference signal and receive feedback configuration information for generating feedback information according to the measurement result from the base station.

The control unit 3120 can measure the reference signal received through the communication unit 3110 and create feedback information in accordance with the feedback configuration information. The control unit 3120 can control the communication unit 3110 to transmit the created feedback information to the base station at a feedback timing according to the feedback configuration information. The control unit 3120 can receive a CSI-RS from the base station, creates feedback information on the basis of determination about whether the received CSI-RS and a corresponding CSI-RS agree with conditions about a CRI, and transmit the created feedback information to the base station. The transmission contents of the feedback information may be changed in accordance with the methods proposed in the embodiments. The control unit 3120 can select a precoding matrix for each of antenna port groups of the base station and further select one additional precoding matrix on the basis of the relationships of the antenna port groups of the base station.

The control unit 3120 can receive a CSI-RS from the base station, create feedback information on the basis of the received CSI-RS, and transmit the created feedback information to the base station. The control unit 3120 can select one precoding matrix for all of the antenna port groups of the base station. The control unit 3120 can receive feedback configuration information from the base station, receive a CSI-RS from the base station, create feedback information on the basis of the received feedback configuration information and the received CSI-RS, and transmit the created feedback information to the base station. The control unit 3120 can receive feedback configuration information corresponding to each of the antenna port groups of the base station and additional feedback configuration information based on the relationships of the antenna port groups.

Figure 32:
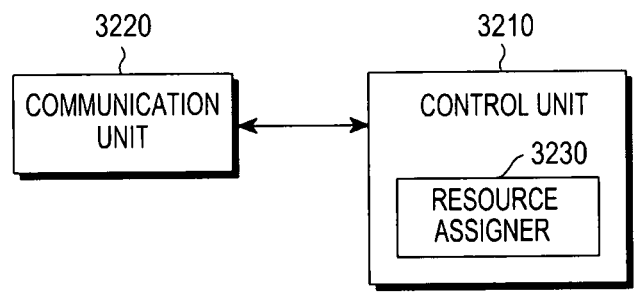
FIG. 32 is a block diagram showing the internal structure of a base station according to an embodiment.

FIG. 32 is a block diagram showing the internal structure of a base station according to an embodiment.

Referring to FIG. 32, the base station includes a control unit 3210 and a communication unit 3220. The control unit 3210 can perform various operations of the base station according to an embodiment by controlling the states and operations of all components included in the base station. In detail, the control unit 3210 determines a CSI-RS resource for estimating a channel of the terminal, a feedback resource of the terminal, and a feedback timing and assigns them to the terminal. To this end, the control unit 3210 may further include a resource assigner 3230. The control unit 3210 assigns feedback configuration and a feedback timing to prevent conflict of feedback from the terminal and receives and analyzes the configured feedback information at a corresponding timing. The communication unit 3220 transmits and receives data, a reference signal, and feedback information to and from the terminal. The communication unit 3220 transmits the CSI-RS to the terminal, using the resource assigned under the control of the control unit 3210, and receives feedback for channel information from the terminal.

Although the resource assigner 3230 is included in the control unit 3120 in the above example, the present disclosure is not limited thereto. That is, the resource assigner 3230 may be included not in the control unit 3210, but the terminal as a physically independent component. The control unit 3210 can control the communication unit 3220 to transmit configuration information for each of one or more reference signals to the terminal, or can create the reference signals. The control unit 3210 can control the communication 3220 to transmit feedback configuration information for generating feedback information according to the measurement result.

The control unit 3210 can control the communication unit 3220 to transmit the reference signals to the terminal and receive feedback information transmitted from the terminal at a feedback timing according to the feedback configuration information. The transmission contents of the feedback information may be changed in accordance with the methods proposed in the embodiments.

The control unit 3210 can transmit feedback configuration information to the terminal, transmit a CSI-RS to the terminal, and receive feedback information created on the CSI-RS from the terminal. The control unit 3210 can transmit feedback configuration information corresponding to each of the antenna port groups of the base station and additional feedback configuration information based on the relationships of the antenna port groups. The control unit 3210 can transmit a beamformed CSI-RS to the terminal on the basis of feedback information and receive feedback information created on the basis of the CSI-RS from the terminal. The control unit 3210 can determine and use which channel state information the terminal has transmitted, by determining whether a corresponding CSI-RS agrees with conditions about a CRI.

According to an embodiment, it is possible to prevent assignment of excessive feedback resources and an increase in channel estimation complexity of a terminal when a base station having many transmission antennas in a two-dimensional antenna array structure transmits CSI-RSs. Further, a terminal can effectively measure all channels for many transmission antennas, can configure the channel as feedback information, and can notify a base station of the feedback information.

Meanwhile, while the disclosure has been shown and described with reference to specific embodiments thereof in the detailed description of the present disclosure, it goes without saying that various changes in form and details may be made therein without departing from the spirit and scope of the disclosure. Therefore, the scope of the present disclosure should not be defined as being limited to the embodiments, but should be defined by the appended claims and equivalents thereof.

The invention claimed is:

1. A method performed by a terminal in a wireless communication system, the method comprising:
receiving, from a base station, at least one channel state information reference signal (CSI-RS) on resource elements in a downlink pilot time slot (DwPTS);
generating channel state information (CSI) based on the at least one CSI-RS; and
transmitting, to the base station, the CSI,
wherein the resource elements are determined based on a special subframe configuration and a cyclic prefix configured for the terminal.

2. The method of claim 1,
wherein the at least one CSI-RS is not received in the DwPTS, in case that a special subframe configuration 0, 5 or 9 is configured for a normal cyclic prefix, and
wherein the at least one CSI-RS is not received in the DwPTS, in case that a special subframe configuration 0, 4 or 7 is configured for an extended cyclic prefix.

3. The method of claim 1,
wherein a frame structure type 2 associated with a time division duplex is used for receiving the CSI-RS.

4. A method performed by a base station in a wireless communication system, the method comprising:
transmitting, to a terminal, at least one channel state information reference signal (CSI-RS) on resource elements in a downlink pilot time slot (DwPTS); and
receiving, from the terminal, channel state information generated based on the at least one CSI-RS,
wherein the resource elements are determined based on a special subframe configuration and a cyclic prefix configured for the terminal.

5. The method of claim 4,
wherein the at least one CSI-RS is not transmitted in the DwPTS, in case that a special subframe configuration 0, 5 or 9 is configured for a normal cyclic prefix, and
wherein the at least one CSI-RS is not transmitted in the DwPTS, in case that a special subframe configuration 0, 4 or 7 is configured for an extended cyclic prefix.

6. The method of claim 4,
wherein a frame structure type 2 associated with a time division duplex is used for transmitting the CSI-RS.

7. A method performed by a terminal in a wireless communication system, the method comprising:
generating a plurality of channel state information based on at least one reference signal received from a base station; and
in case that at least two channel state information of the plurality of channel state information are transmitted in a same subframe, joint-encoding and transmitting the at least two channel state information to the base station in the same subframe.

8. The method of claim 7, wherein the at least two channel state information include a Channel State Information Reference Signal (CSI-RS) Resource Index (CRI) and a Rank Indicator (RI).

9. A method performed by a base station in a wireless communication system, the method comprising:
transmitting at least one reference signal to a terminal; and
receiving a plurality of channel state information generated based on the at least one reference signal from the terminal,
wherein, in case that at least two channel state information of the plurality of channel state information are received in a same subframe, the at least two channel state information are joint-encoded and received from the terminal in the same subframe.

10. The method of claim 9, wherein the at least two channel state information include a Channel State Information Reference Signal (CSI-RS) Resource Index (CRI) and a Rank Indicator (RI).

11. A method performed by a terminal in a wireless communication system, the method comprising:
selecting at least one channel state information reference signal (CSI-RS) from a plurality of reference signals received from a base station;
determining whether a rank indicator (RI) or precoding matrix indicator (PMI) drop occurs between serving cells configured for the terminal;
determining whether a first CSI-RS resource index (CRI) which was previously reported to the base station is identical to a second CRI to be reported, in case that the RI or PMI drop has occurred;
transmitting, to the base station, a first channel state information (CSI) including a most recently reported RI or PMI, in case that the first CRI is identical to the second CRI; and
transmitting, to the base station, a second CSI generated based on a most recent RI or PMI having a CRI identical to the second CRI, in case that the first CRI is different from the second CRI.

12. The method of claim 11,
wherein an RI or PMI of a serving cell having a lowest index among the serving cells is reported.

13. A method performed by a base station in a wireless communication system, the method comprising:
transmitting a plurality of reference signals including at least one channel state information reference signal (CSI-RS), to a terminal;
receiving, from the terminal, a first channel state information (CSI) including a most recently reported rank indicator (RI) or precoding matrix indicator (PMI), in case that an RI or PMI drop has occurred between serving cells configured for the terminal and a first CSI-RS resource index (CRI) which was previously reported to the base station is identical to a second CRI to be reported; and
receiving, from the terminal, a second CSI generated based on a most recent RI or PMI having a CRI identical to the second CRI, in case that the RI or PMI drop has occurred and the first CRI is different from the second CRI.

14. The method of claim 13,
wherein an RI or PMI of a serving cell having a lowest index among the serving cells is reported.

15. A terminal in a wireless communication system, the terminal comprising:

a transceiver configured to transmit and receive a signal; and a controller configured to:
- receive, from a base station, at least one channel state information reference signal (CSI-RS) on resource elements in a downlink pilot time slot (DwPTS),
- generate channel state information (CSI) based on the at least one CSI-RS, and
- transmit, to the base station, the CSI,
- wherein the resource elements are determined based on a special subframe configuration and a cyclic prefix configured for the terminal.

16. The terminal of claim 15,
wherein the at least one CSI-RS is not received in the DwPTS, in case that a special subframe configuration 0, 5 or 9 is configured for a normal cyclic prefix, and
wherein the at least one CSI-RS is not received in the DwPTS, in case that a special subframe configuration 0, 4 or 7 is configured for an extended cyclic prefix.

17. The terminal of claim 15,
wherein a frame structure type 2 associated with a time division duplex is used for receiving the CSI-RS.

18. A base station in a wireless communication system, the base station comprising:

a transceiver configured to transmit and receive a signal; and a controller configured to:
- transmit, to a terminal, at least one channel state information reference signal (CSI-RS) on resource elements in a downlink pilot time slot (DwPTS), and
- receive, from the terminal, channel state information generated based on the at least one CSI-RS,
- wherein the resource elements are determined based on a special subframe configuration and a cyclic prefix configured for the terminal.

19. The base station of claim 18,
wherein the at least one CSI-RS is not transmitted in the DwPTS, in case that a special subframe configuration 0, 5 or 9 is configured for a normal cyclic prefix, and
wherein the at least one CSI-RS is not transmitted in the DwPTS, in case that a special subframe configuration 0, 4 or 7 is configured for an extended cyclic prefix.

20. The base station of claim 18, wherein a frame structure type 2 associated with a time division duplex is used for transmitting the CSI-RS.

* * * * *